United States Patent
Rohde et al.

(10) Patent No.: US 10,963,694 B2
(45) Date of Patent: Mar. 30, 2021

(54) DUPLICATE USER INTERFACE DESIGN IDENTIFICATION

(71) Applicant: salesforce.com, inc., San Francisco, CA (US)

(72) Inventors: Sonke Rohde, San Francisco, CA (US); Brian J. Lonsdorf, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 133 days.

(21) Appl. No.: 16/177,031

(22) Filed: Oct. 31, 2018

(65) Prior Publication Data

US 2020/0134310 A1 Apr. 30, 2020

(51) Int. Cl.
*G06K 9/00* (2006.01)
*G06F 16/9537* (2019.01)
*G06F 40/14* (2020.01)

(52) U.S. Cl.
CPC ..... *G06K 9/00483* (2013.01); *G06F 16/9537* (2019.01); *G06F 40/14* (2020.01)

(58) Field of Classification Search
CPC .. G06F 9/451; G06F 8/36; G06F 8/38; G06N 20/00
See application file for complete search history.

(56) References Cited

U.S. PATENT DOCUMENTS

| | | | |
|---|---|---|---|
| 8,490,050 B2 | 7/2013 | Crider et al. | |
| 2006/0277496 A1* | 12/2006 | Bier | G06T 11/206 715/810 |
| 2007/0028181 A1* | 2/2007 | Tinari | G06F 40/131 715/764 |
| 2009/0217302 A1* | 8/2009 | Grechanik | G06F 9/45512 719/320 |
| 2011/0246913 A1 | 10/2011 | Lydick et al. | |
| 2013/0132870 A1 | 5/2013 | Vishnubhatta et al. | |
| 2014/0013247 A1 | 1/2014 | Beechuk et al. | |
| 2016/0188183 A1* | 6/2016 | Soffer | G06F 3/0481 715/762 |
| 2018/0046609 A1* | 2/2018 | Agarwal | G06F 40/55 |
| 2018/0335849 A1* | 11/2018 | Liddell | G06F 3/0488 |
| 2019/0188272 A1* | 6/2019 | Chen | G06Q 50/01 |
| 2020/0133643 A1* | 4/2020 | Hou | G06F 8/38 |
| 2020/0133644 A1* | 4/2020 | Hou | G06F 40/14 |
| 2020/0133692 A1* | 4/2020 | Rohde | G06F 9/451 |

OTHER PUBLICATIONS

Get Started With User Interface API, salesforce.com, inc., copyright 2000-2018, accessed Oct. 25, 2018, 5 pages.

\* cited by examiner

*Primary Examiner* — Wesley J Tucker
(74) *Attorney, Agent, or Firm* — Kowert, Hood, Munyon, Rankin & Goetzel, P.C.

(57) ABSTRACT

Techniques are disclosed relating to identifying duplicate coding and/or design used in different parts of a user interface (e.g., a web application). In some embodiments, a plurality of visible elements of an interface are detected based on hierarchical user interface code. In some embodiments, a device groups sets of the plurality of visible elements based on determined coordinates and depth levels for the detected elements. In some embodiments, groups that meet a threshold similarity criterion are identified. In some embodiments the threshold similarity criterion is based on classification of detected elements and/or geospatial analysis.

20 Claims, 27 Drawing Sheets

*User interface code 210*

```
<div>
    <img src="...">
    <div>
        <a>John Doe</a>
        <a href="https://www.jd.com">link text</a>
    </div>
</div>
```

Elements

*Displayed interface 220*

*Identified component 230*

| Image element 232 | Label element 234 |
|---|---|
|  | Link element 236 |

*Elements may be grouped into components based on their coordinates, depth in the interface code hierarchy, and classification.*

*Fig. 2A*

| X | Y | Depth | K-Means Group 610 |
|---|---|---|---|
| 1 | 1 | 4 | 1 |
| 6 | 3 | 16 | 1 |
| 6 | 4 | 16 | 1 |
| 6 | 5 | 25 | 2 |
| ⋮ | ⋮ | ⋮ | ⋮ |

Store template information that defines a plurality of component types and one or more display parameters identified for one or more user interfaces, where a component type specifies a set of one or more user interface element types included in the component and a display parameter specifies how one or more components are to be displayed
2110

Receive a request to automatically generate a user interface in accordance with the template information, wherein the request specifies data for a set of elements to be displayed in the user interface
2120

Group ones of the set of elements into multiple components according to multiple ones of the component types
2130

Format the components according to the display parameters
2140

Cause display of a user interface that displays the components based on the formatting
2150

Fig. 21

DUPLICATE USER INTERFACE DESIGN IDENTIFICATION

CROSS-REFERENCE TO RELATED APPLICATIONS

This application is related to the following U.S. Applications filed on Oct. 31, 2018: U.S. application Ser. No. 16/176,760, U.S. application Ser. No. 16/176,933, U.S. application Ser. No. 16/176,978, U.S. application Ser. No. 16/177,050, U.S. application Ser. No. 16/177,065, and U.S. application Ser. No. 16/177,092. Each of the above-referenced applications is hereby incorporated by reference as if entirely set forth herein.

BACKGROUND

Technical Field

Embodiments described herein relate to user interface technology and, in particular, to component-based techniques for automatically generating user interfaces.

Description of the Related Art

User interfaces are often generated by multiple skilled designers, e.g., to combine quality coding techniques with graphical design to achieve desired functionality while pleasing the eye, achieving branding goals, or promoting desired user behaviors. Many entities may desire customized interfaces rather than using generic templates. Many entities do not have access, however, to coding or design expertise needed to generate an effective user experience.

BRIEF DESCRIPTION OF THE DRAWINGS

FIG. 2A is a diagram illustrating example user interface code and a resultant display of an identified component, according to some embodiments.

FIG. 21 is a flow diagram illustrating an example component-based method for automatically generating a user interface, according to some embodiments.

Figure 1:
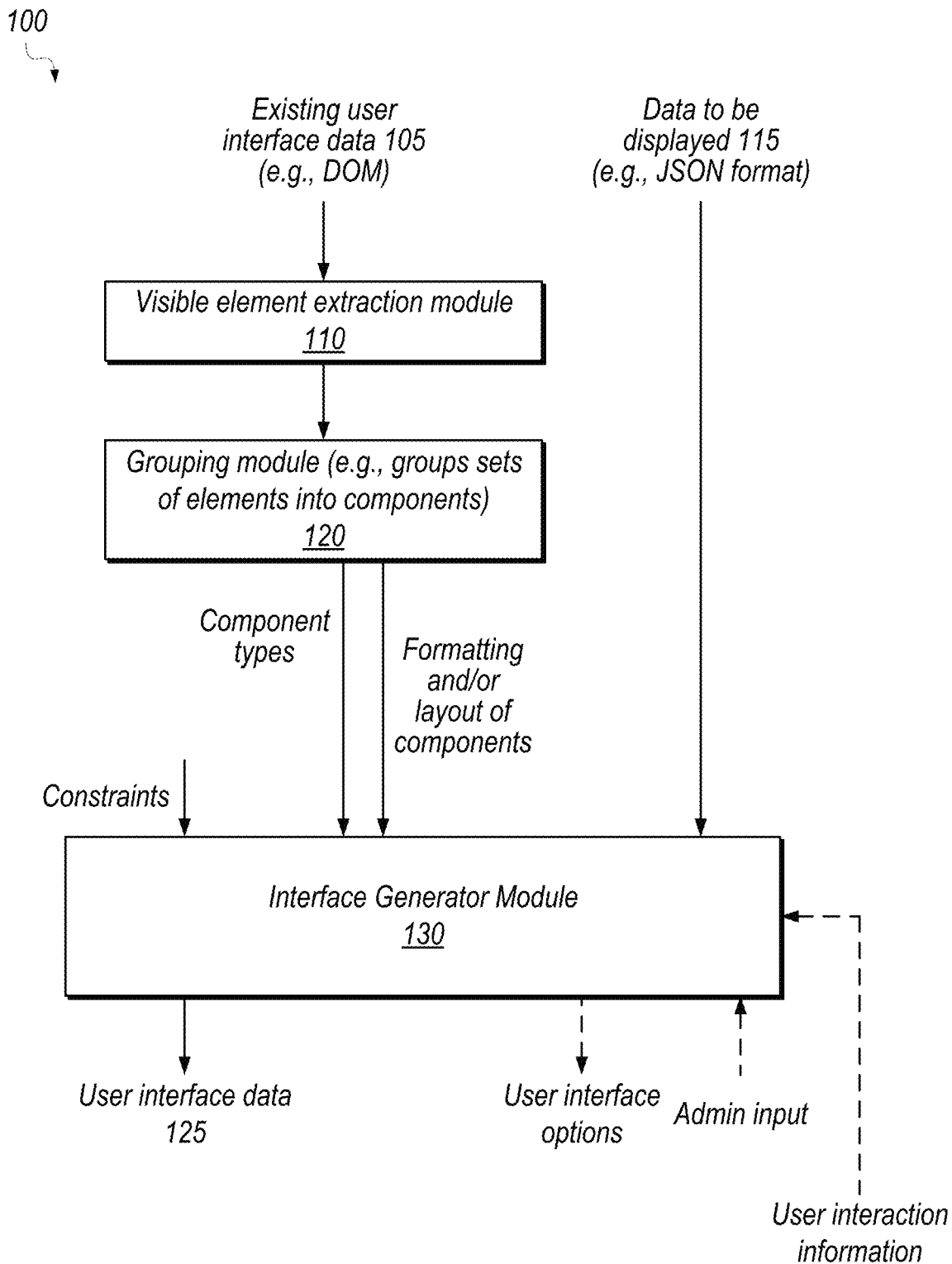
FIG. 1 is a block diagram illustrating an example system for automatically generating user interface data, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "module configured to select a component type" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

DETAILED DESCRIPTION

In various disclosed embodiments, a computing system is configured to automatically generate user interface code for input data to be displayed. For example, the input data may be specified via an application programming interface (API) without complete specification of layout or formatting and the computing system may automatically group and format the input data. Various techniques discussed herein are component-based and map user input data to known component types and automatically format components. A component may include multiple visible user interface elements (e.g., images, text strings, links, etc.). In some embodiments, a machine learning engine is trained to identify and format components based on code from prior user interfaces.

In some embodiments, the system may generate a user interface subject to one or more constraints. For example, the constraints may be based on available screen resolution, predicted events, style from another interface, etc. In some embodiments, techniques similar to those used to identify components on existing interfaces may also identify and report duplicate designs (and may automatically merge such portions of the interface).

In various embodiments, the disclosed techniques may allow entities to automatically generate user interfaces without requiring knowledge of design or coding techniques. Further, the disclosed techniques may advantageously improve existing user interface technology, including automating design tasks that were previously performed manually, in a new way (e.g., using component-based techniques). These techniques may improve user interface flexibility and functionality, in various embodiments.

Figure 2B:
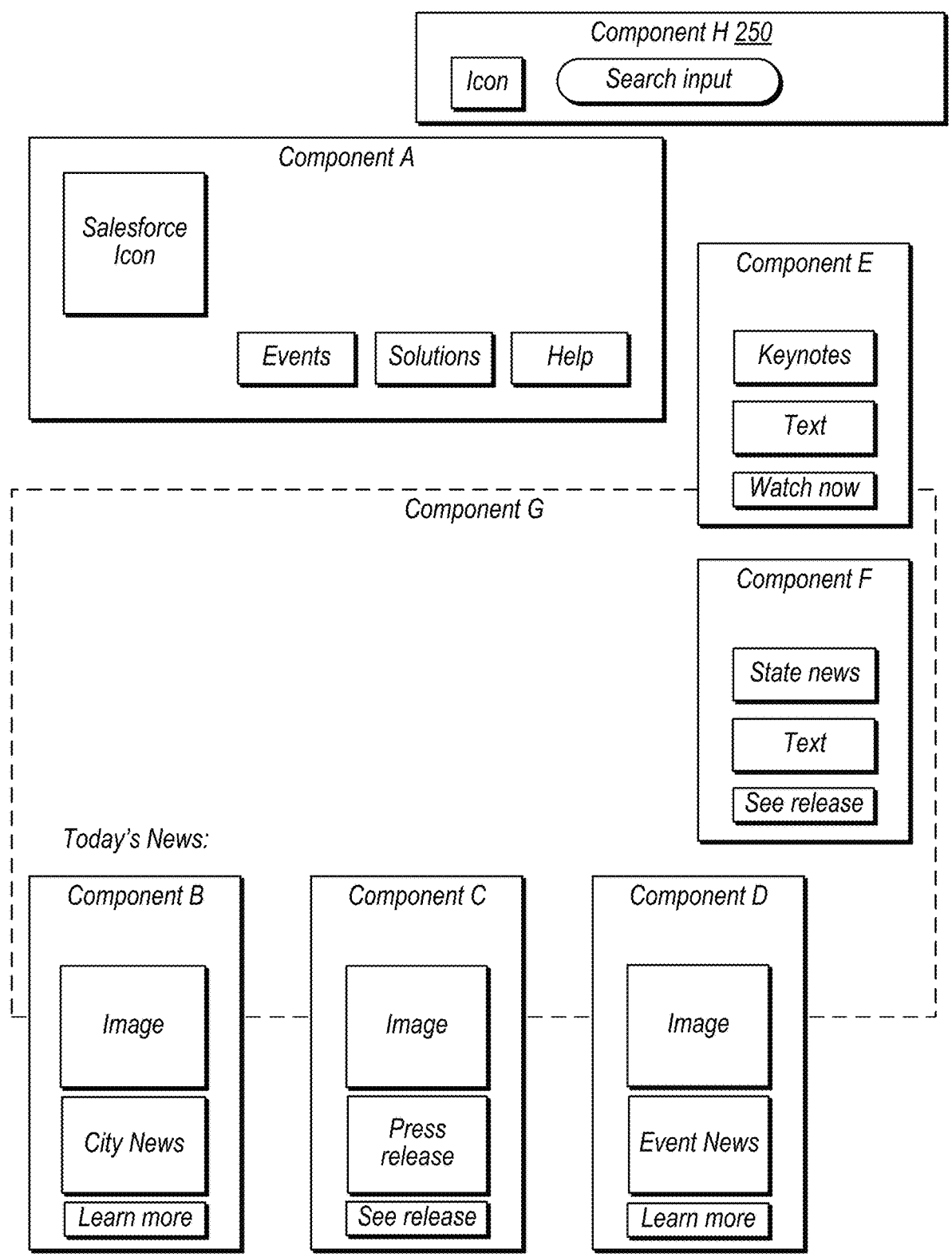
FIG. 2B is a block diagram illustrating an example user interface with multiple component types, according to some embodiments.

This disclosure initially describes, with reference to FIGS. 1-2B, a system for automatically generating a user interface using component-based techniques and example components within an interface. Example code, elements, components, and a user interface are discussed with reference to FIGS. 2A and 2B. Techniques for generating component types based on one or more existing interfaces are discussed with reference to FIGS. 3-17. Example techniques for identifying duplicate interface design are discussed with reference to FIG. 18.

This disclosure then describes, with reference to FIGS. 19-21, example techniques for automatically generating user interfaces using known component types (which may be identified using the techniques discussed with reference to the prior figures). Techniques for automatically generating an interface for predicted or speculative events are discussed with reference to FIG. 22. Machine learning techniques with feedback based on user activity are discussed with reference to FIGS. 23-25.

Overview of System for Automatically Generating User Interfaces

FIG. 1 is a block diagram illustrating an example system for automatically generating user interface data, according to some embodiments. In the illustrated embodiment, system 100 analyzes existing user interface data 105, receives data to be displayed 115, and automatically generates output user interface data 125. In the illustrated embodiment, system 100 includes visible element extraction module 110, grouping module 120, and interface generator module 130. In some embodiments, system 100 also presents user interface options and receives admin input and/or user interaction information (e.g., which may be used to train computer learning implementations of module 130).

Visible element extraction module 110, in the illustrated embodiment, receives data 105 from an existing user interface. This data may be specified according to a hierarchical tree structure (e.g., using document object model (DOM) techniques). In some embodiments, module 110 extracts elements that may be visible in the user interface from the user interface data 105. For example, these elements may be leaf nodes of the tree structure.

Grouping module 120, in some embodiments, is configured to group sets of extracted elements into components. In some embodiments, this grouping is based on coordinates of the elements and depth of the elements within the tree. In the illustrated embodiment, module 120 provides detected component types and display parameters (e.g., formatting and/or layout components) to interface generator module 130.

Interface generator module 130, in the illustrated embodiment, is configured to generate user interface data 125 based on the data from module 120 and one or more input constraints. In some embodiments, module 130 provides one or more options, e.g., selectable by an administrator for implementation in the interface. In some embodiments, module 130 receives information based on user interaction with the interface, which may be used for training, for example.

Various techniques disclosed herein may be used alone or in combination. The disclosed architectures are included for purposes of illustration, but are not intended to limit the scope of the present disclosure. For example, various functionality described with reference to one module may be performed by other modules, in other embodiments.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Note that the modules of FIG. 1 may be included in different computing systems, in some embodiments. For example, in some embodiments a first computing system may generate the component types and formatting/layout information and transmit this data to a second computing system that implements module 130. Further, various actions discussed herein may be performed in close time proximity or may be separated. For example, once a set of component types and formatting/layout data has been generated, this data may be used to automatically generate other interfaces potentially indefinitely.

Example Code, Elements, Components, and User Interface

FIG. 2A is a diagram illustrating example user interface code and a resultant display of an identified component, according to some embodiments. In the illustrated embodiment, the leaf nodes (the elements) in code 210 are emphasized using dashed and dotted lines. These elements can be displayed in interface 220 (although that element may not always be displayed, e.g., due to input variables, user scrolling, user interaction, etc.). As indicated in FIG. 2A, elements may be grouped into components based on coordinates, classification, and/or depth in the interface code hierarchy.

As used herein, the term "element" refers to information that can be output on a user interface, e.g., visually or audibly. Elements are typically explicitly indicated by user interface code. For hierarchical code such as Hypertext Markup Language (HTML), for example, elements are typically leaf nodes. Non-limiting examples of types of elements include text, links, images, etc.

As used herein, the term "component" refers to a group of one or more elements. Typically, components include multiple elements. Components are typically not explicitly identified by traditional user interface code. Rather, various disclosed techniques automatically detect component types for use in auto-generating user interfaces. A component type may define a set of elements that make up a class of components. For example, a component type may include an image, a link, and multiple lines of text. The component type may also have corresponding display parameters that specifying formatting and layout of elements within components of the type. In some embodiments, component types are used to automatically organize user interface inputs into a user interface.

In the example of FIG. 2A, displayed interface 220 includes an identified component 230 that includes an image element 232, a label element 234, and a link element 236. For example, for the code 210, the image element 232 may be an image indicated by the <img src=" . . . "> line, the label 234 may display the text "John Doe" and the link 236 may be selectable to visit www.jd.com.

FIG. 2B is a block diagram illustrating an example user interface with multiple identified components, according to some embodiments. In the illustrated embodiment, the interface includes components A through H. In the illustrated embodiment, components B, C, and D may be identified as the same component type and components E and F may be identified as the same component type. Note that the same type of component may be used to display different content, but may use the same set of elements to do so.

Component G, in the illustrated embodiment, may include a single element, e.g., a background image for the interface. As shown, components may be at least partially overlapping in a display space, in some embodiments. Component A is an overall toolbar for multiple pages of a web interface and component H is a search component. Note that the components in FIG. 2B may be identified using techniques discussed in further detail below in an existing interface. In other embodiments, component types for the illustrated embodiments may be automatically determined for user interface inputs and the interface of FIG. 2B may be generated automatically.

FIGS. 3-17, discussed in further detail below, discuss example techniques for determining a set of component types from one or more existing interfaces. Note that various techniques discussed in combination with other techniques may also be used separately and the various techniques disclosed herein may be combined in various different combinations.

Overview of Grouping Module

Figure 3:
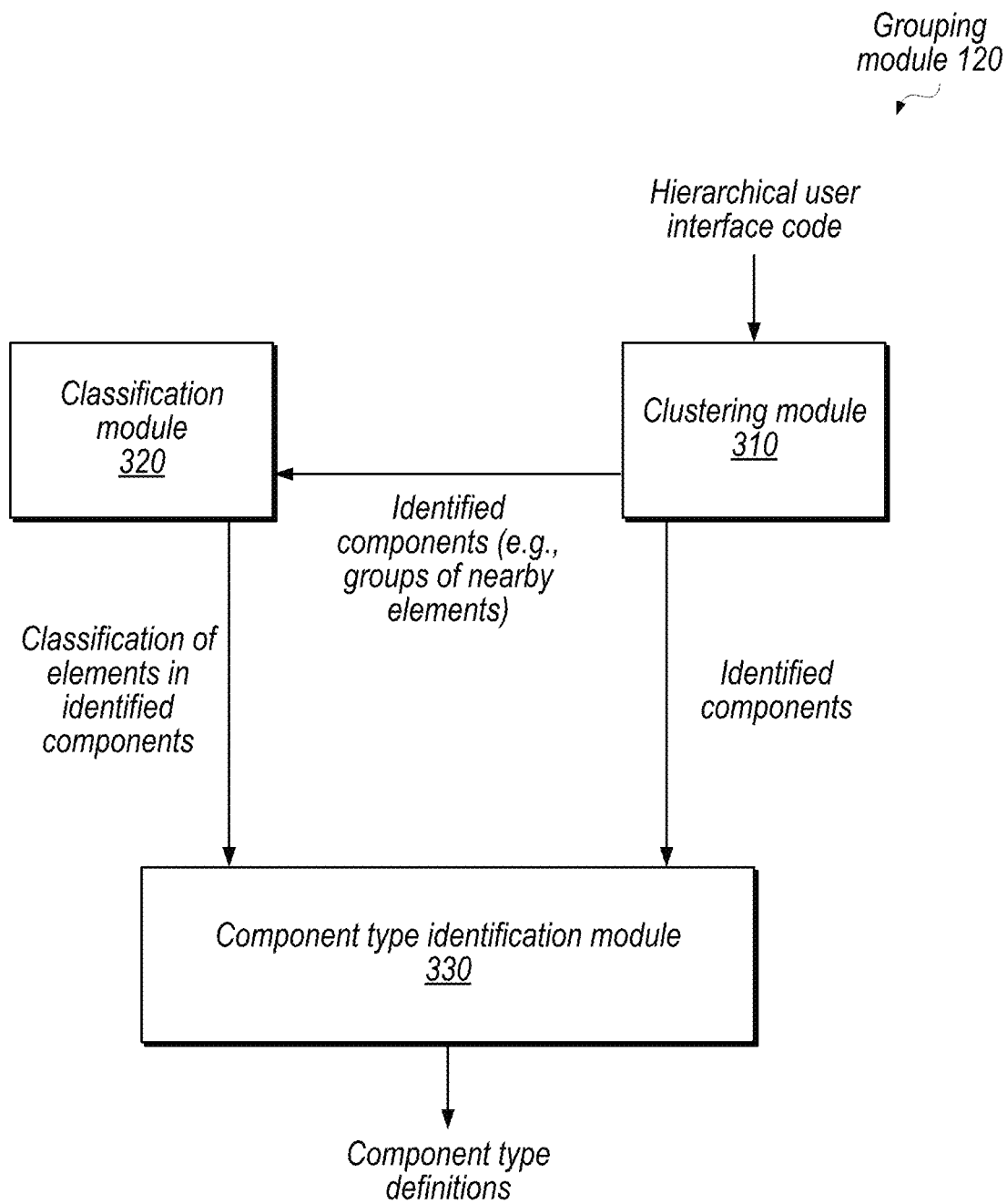
FIG. 3 is a block diagram illustrating an example grouping module for generating sets of component types based on existing user interfaces, according to some embodiments.

FIG. 3 is a block diagram illustrating an example grouping module for generating sets of component types based on existing user interfaces, according to some embodiments. In the illustrated embodiment, grouping module 120 includes clustering module 310, classification module 320, and component type identification module 330. In some embodiments, the component type definitions, generated based on clustering and classification, and component type identification techniques, are used as training data for a machine learning system, where the system automatically generates one or more user interfaces. For example, interface generator module 130, discussed above with reference to FIG. 1, may use component type definitions received from grouping module 120.

In the illustrated embodiment, clustering module 310 receives hierarchical user interface code for one or more existing graphical user interfaces (GUIs). Based on the user interface code, in some embodiments, module 310 identifies groups of nearby user interface elements. In some embodiments, clustering module 310 generates groups of elements using unsupervised clustering, as discussed below with reference to FIGS. 4-8.

In some embodiments, as discussed above with reference to FIG. 1, the hierarchical user interface code is a tree structure such as a DOM tree. In some embodiments the DOM is a programming interface for an HTML document that represents a website page, where each leaf node (nodes that do not have child nodes) of the tree structure represents an output element of the user interface.

In the illustrated embodiment, classification module 320 receives identified components from clustering module 310. In the illustrated embodiment, classification module 320 classifies one or more elements in the groups of identified components received from module 310. In the illustrated embodiment, classification module 320 sends classification information for the elements in the identified components to component type identification module 330.

In some embodiments, component type identification module 330 calculates a similarity metric between components based on the classification and bounding boxes of the identified components. In some embodiments, module 330 generates component type definitions for sets of similar components that meet a threshold similarity metric. In the illustrated embodiment, module 330 generates component type definitions.

In some embodiments, the component type definitions generated by component type identification module 330 are stored in a database. In some embodiments, the database stores input and/or training data (e.g., component type definitions, user interaction information, formatting information, display parameters, etc.) for a machine learning system that automatically generates user interface data.

Example Techniques for Grouping User Interface Elements into Components

Figure 4A:
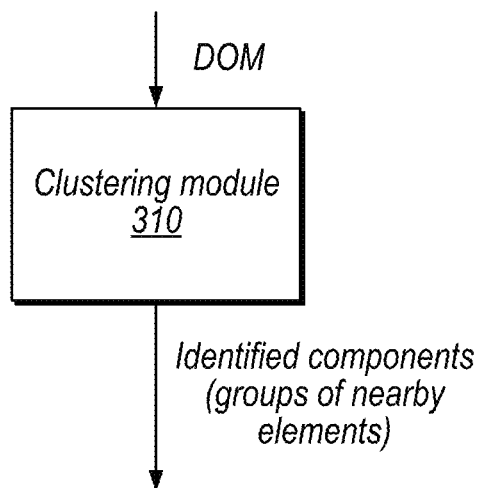
FIGS. 4A and 4B are diagrams illustrating example techniques for grouping nearby elements of existing user interfaces into components, according to some embodiments.
Figure 4B:
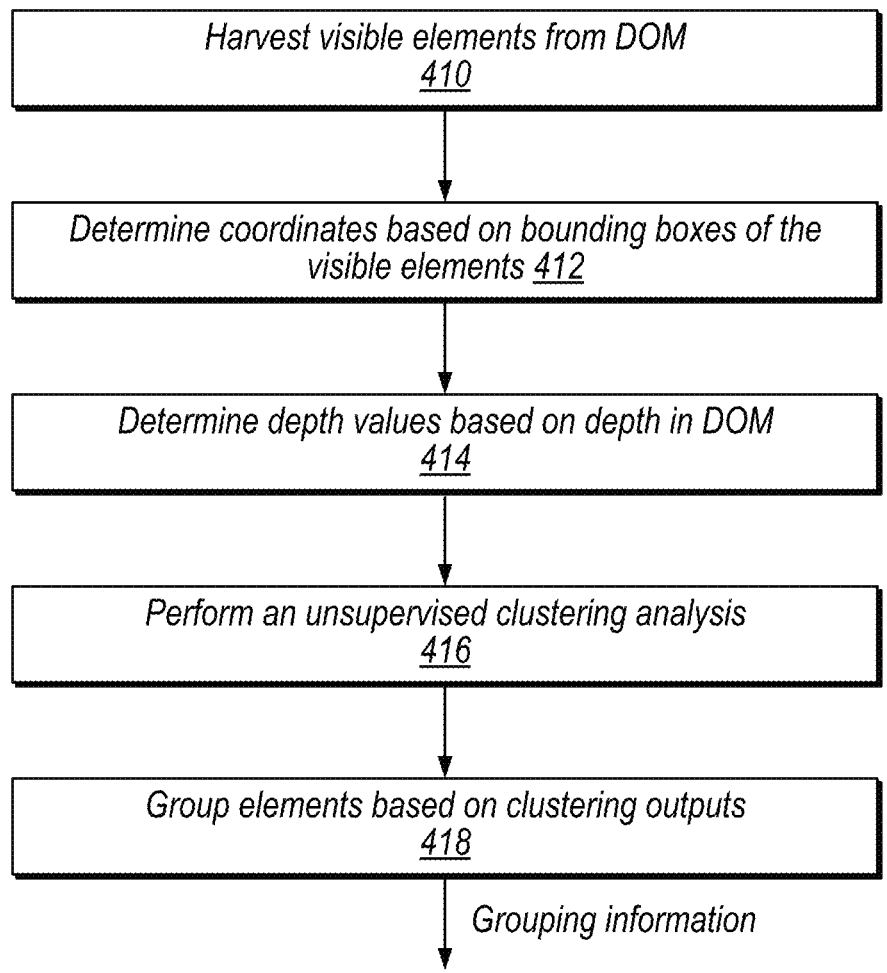

FIGS. 4A and 4B are diagrams illustrating example techniques for grouping nearby elements of existing user interfaces into components, according to some embodiments. In FIG. 4A, clustering module 310 receives one or more DOMs for existing user interfaces. In the illustrated embodiment, based on the DOM, module 310 identifies components by grouping nearby elements. As discussed above with reference to FIG. 2A, in some embodiments, types of elements within the identified components include one or more of the following: a label, text, an image, a link, a video, a button, a selectable shape, a drop-down list, a search input, etc. Note that certain element types (e.g., text) may include multiple other sub-types (e.g., labels, links, etc.) or types may be identified to be mutually exclusive, in some embodiments.

At element 410, clustering module 310 harvests the visible elements (e.g., leaf nodes) from the DOM of one or more existing user interfaces. In some embodiments, module 310 implements the functionality discussed above with reference to visible element extraction module 110 of FIG. 1.

At element 412, in the illustrated embodiment, clustering module 310 determines coordinates based on the bounding boxes of the visible elements. Examples of coordinate values for bounding boxes are discussed below with reference to FIGS. 6A and 6B.

At element 414, in the illustrated embodiment, module 310 determines depth values based on element depths within the DOM (e.g., the number of levels of the element from the root level of the DOM).

At 416, in the illustrated embodiment, module 310 performs an unsupervised clustering process. In some embodiments, the process is a k-means clustering processes. Examples of depth values and k-means clustering are discussed in further detail below with reference to FIG. 5.

At element 418, in the illustrated embodiment, module 310 groups elements based on the outputs from the unsupervised clustering. In the illustrated embodiment, clustering module 310 outputs grouping information for user interface elements. Examples of element grouping are discussed below with reference to FIG. 7. In some embodiments, the grouping information generated by module 310 is used as training data for machine learning. In some embodiments, grouping information is sent to modules 320 and 330 for classification and identification of elements within the groups (components).

Figure 5:
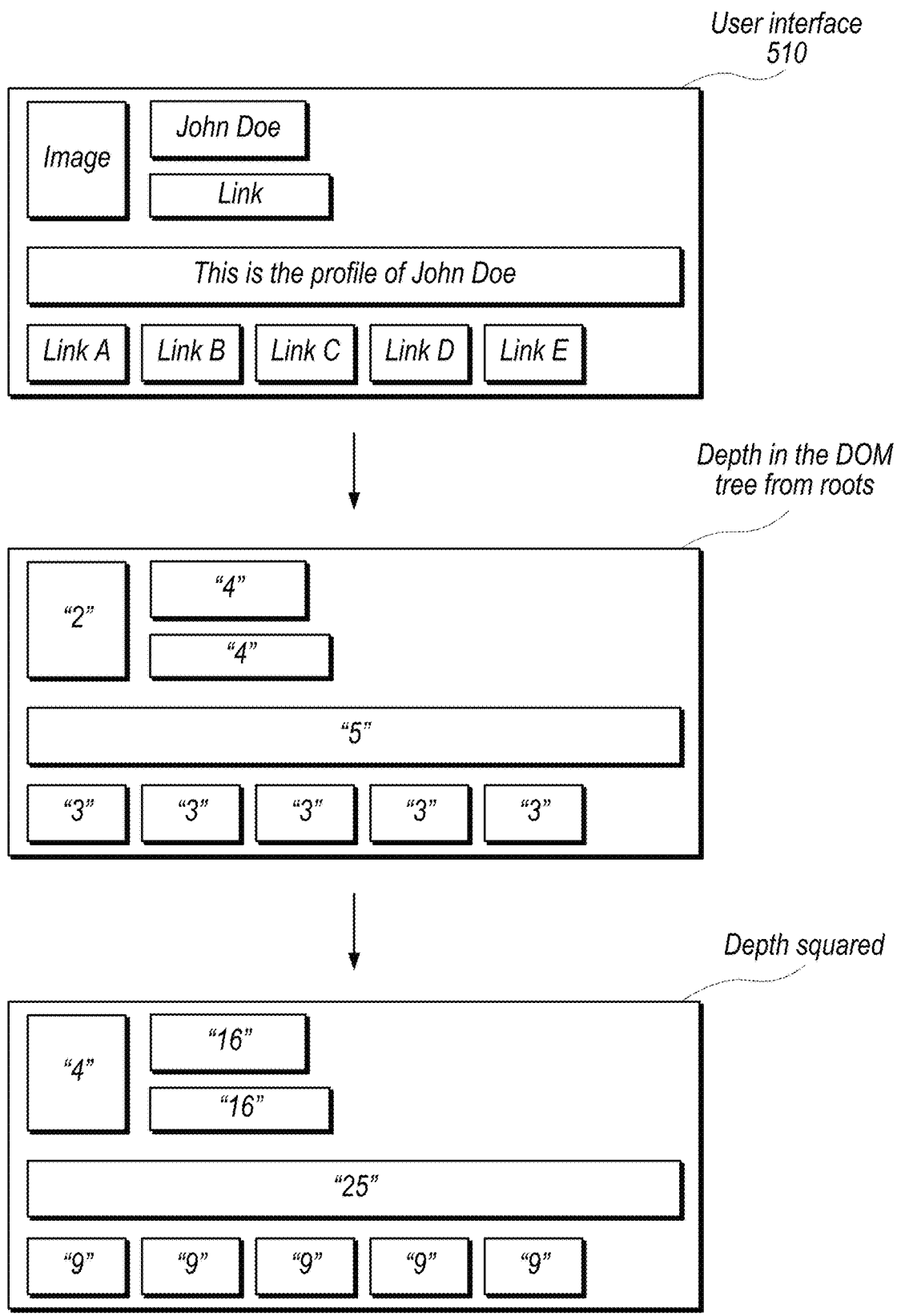
FIG. 5 is a diagram illustrating a user interface and various corresponding depths of displayed user interface elements within hierarchical interface code, according to some embodiments.

FIG. 5 is a diagram illustrating a user interface and various corresponding depths of displayed user interface elements within hierarchical interface code, according to some embodiments. In the illustrated embodiment, user interface (UI) 510 includes various visible interface elements, including: an image, a link, a label ("John Doe"), text ("This is the profile of John Doe"), and links A-E. The information displayed in UI 510, in the illustrated embodiment, is contained in the interface code received by clustering module 310. In some embodiments, clustering module 310 determines the depths of each of the visible elements in the tree. In the illustrated example, the depths in the tree from the roots are shown for the various elements displayed in UI 510.

In some embodiments, the displayed depth values are modified using a non-linear function by clustering module 310. For example, in the illustrated embodiment, the lower portion of the image illustrates squared depth values. In some embodiments, the depth values are exponentially modified by a value other than two (e.g., 1.5, 3, 4, 5, etc.). In some embodiments, the depth values are modified using mathematical functions other than exponential functions. In some embodiments, the depth values are modified to alter the effects of differences in the depth values, relative to the effects of other clustering inputs such as coordinates of the bounding boxes of the leaf elements (e.g., to emphasize the depth value over the coordinates).

In some embodiments, in addition to determining the depths of the visible user interface elements in the DOM, the clustering module 310 determines coordinates in one or more dimensions (e.g., horizontal and vertical coordinates, typically referred to as x and y coordinates) of the visible elements in a screen space for UI 510. Although two-dimensional bounding boxes are discussed herein for purposes of illustration, additional dimensions may also be considered, in other embodiments, e.g., a z-dimension in three-dimensional displays. In some embodiments, the horizontal and vertical coordinate values, in addition to the squared depth values, are stored and evaluated by clustering module 310.

Figures 6A, 6B:
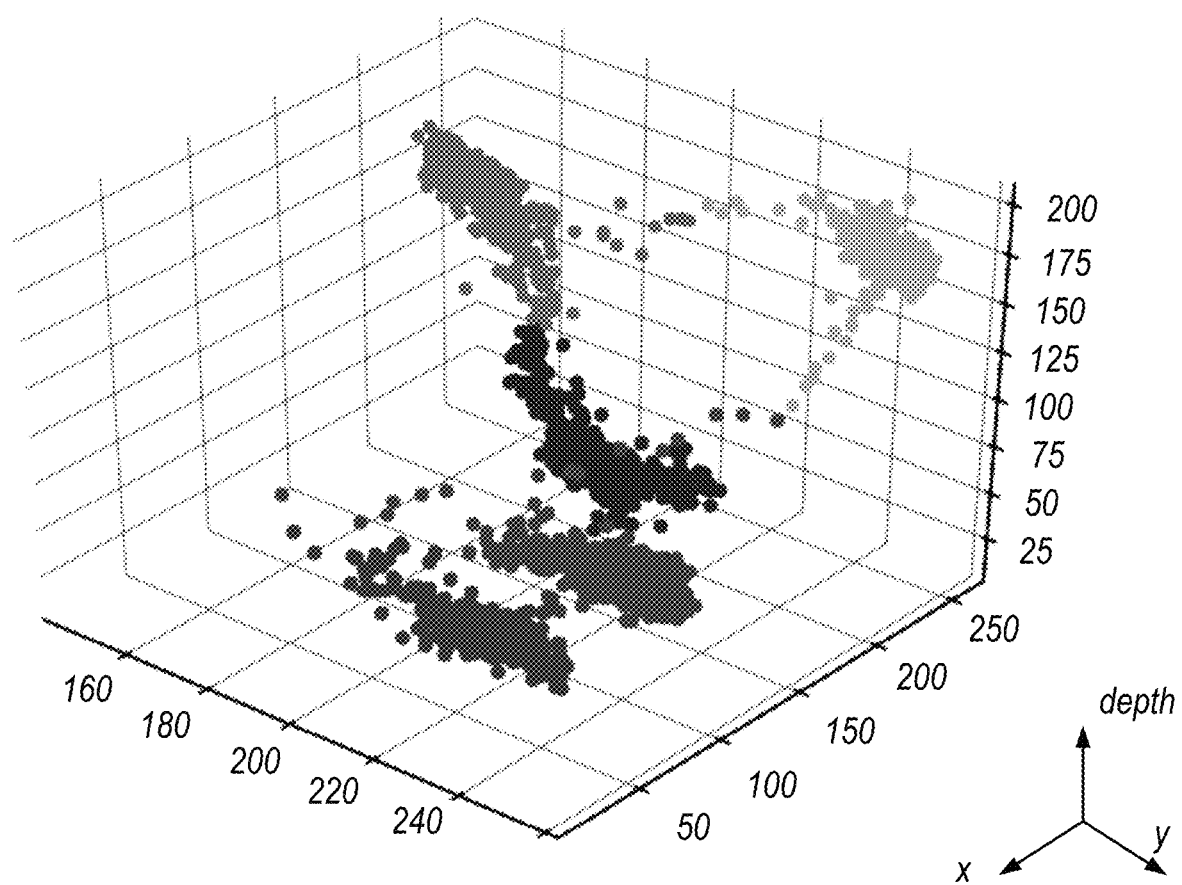
FIGS. 6A and 6B illustrate an unsupervised k-means clustering example based on coordinates and depth, according to some embodiments.

FIGS. 6A and 6B illustrate an unsupervised k-means clustering example based on coordinates and depth, according to some embodiments. FIG. 6A is a plot of example x coordinate values, y coordinate values, and squared depth values (stored by clustering module 310) as points in a three-dimensional space. In other embodiments, clustering may be performed with other numbers of dimensions, e.g., for three-dimensional interfaces. In the illustrated graph, points have been grouped using k-means clustering with different groups having different shades.

In the illustrated embodiment, five different k-means groups are shown. Various numbers of groupings may be produced from unsupervised clustering. In some embodiments, the number of k-means groupings is based on the total number (and/or locations) of elements in a user interface. For example, if there are 100 different elements within a user interface, there may be 30 different k-means groupings for that user interface. In some embodiments, each group corresponds to a component and may be further analyzed to determine a set of component types for the interface.

In FIG. 6B, a table is shown with the x, y, and depth values, along with the resultant k-means grouping values 610 determined by unsupervised k-means clustering for some of the interface elements from FIG. 5. In the illustrated embodiment, the image, the label "John Doe", and the link of UI 510 are grouped in k-means group 1. The text "This is the profile of John Doe" of UI 510 is grouped in k-means group 2, in the illustrated embodiment. Note that, in some embodiments, no element is grouped within multiple groups (e.g., the elements may not overlap in groupings).

An unsupervised k-means clustering process may group values based on their relative distances from each other within the k-means graph (e.g., their relative x, y, and z coordinates). In some embodiments, one or more other clustering processes are used in addition to or in place of k-means clustering, such as one or more of the following: Gaussian mixture mode, expectation-maximization, density-based spatial clustering of applications with noise (DB-SCAN), mean-shift, and/or affinity propagation.

Figure 7:
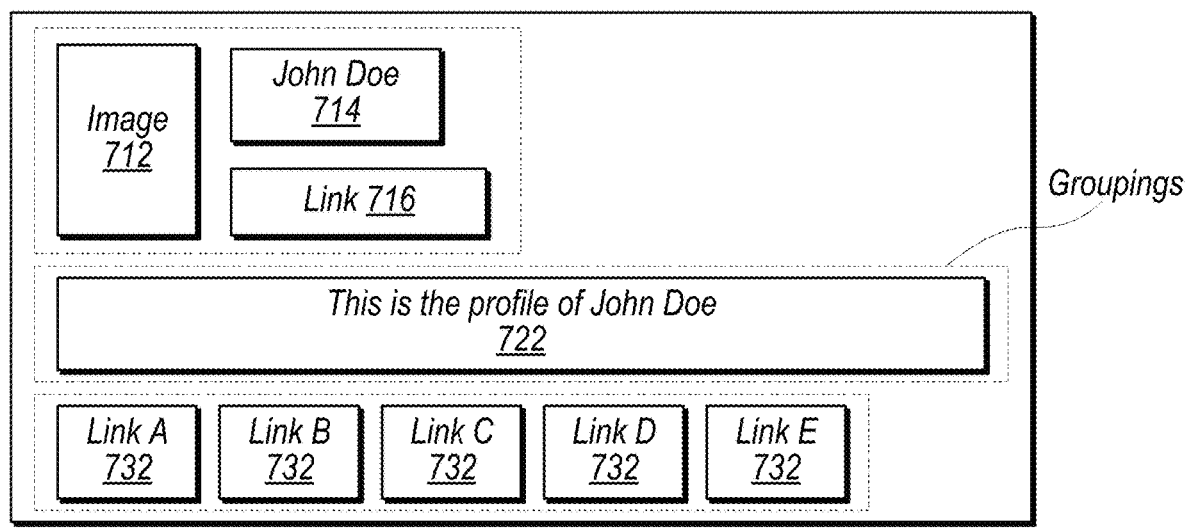
FIG. 7 is a block diagram illustrating a user interface corresponding to FIG. 5 with elements grouped into different components, according to some embodiments.

FIG. 7 is a block diagram illustrating a user interface corresponding to FIG. 5 with elements grouped into components, according to some embodiments. In the illustrated embodiment, groupings are shown using dashed lines based on the k-means clustering performed for the elements of user interface 510. In the illustrated embodiment, image 712, label 714, and link 716 are grouped together based on the unsupervised k-means clustering assigning each of these elements a k-means group value of 1. In the illustrated embodiment, text 722 is the only element in its respective grouping (group 2). In the illustrated embodiment, links A-E 732 are grouped together in a third grouping.

Figure 8:
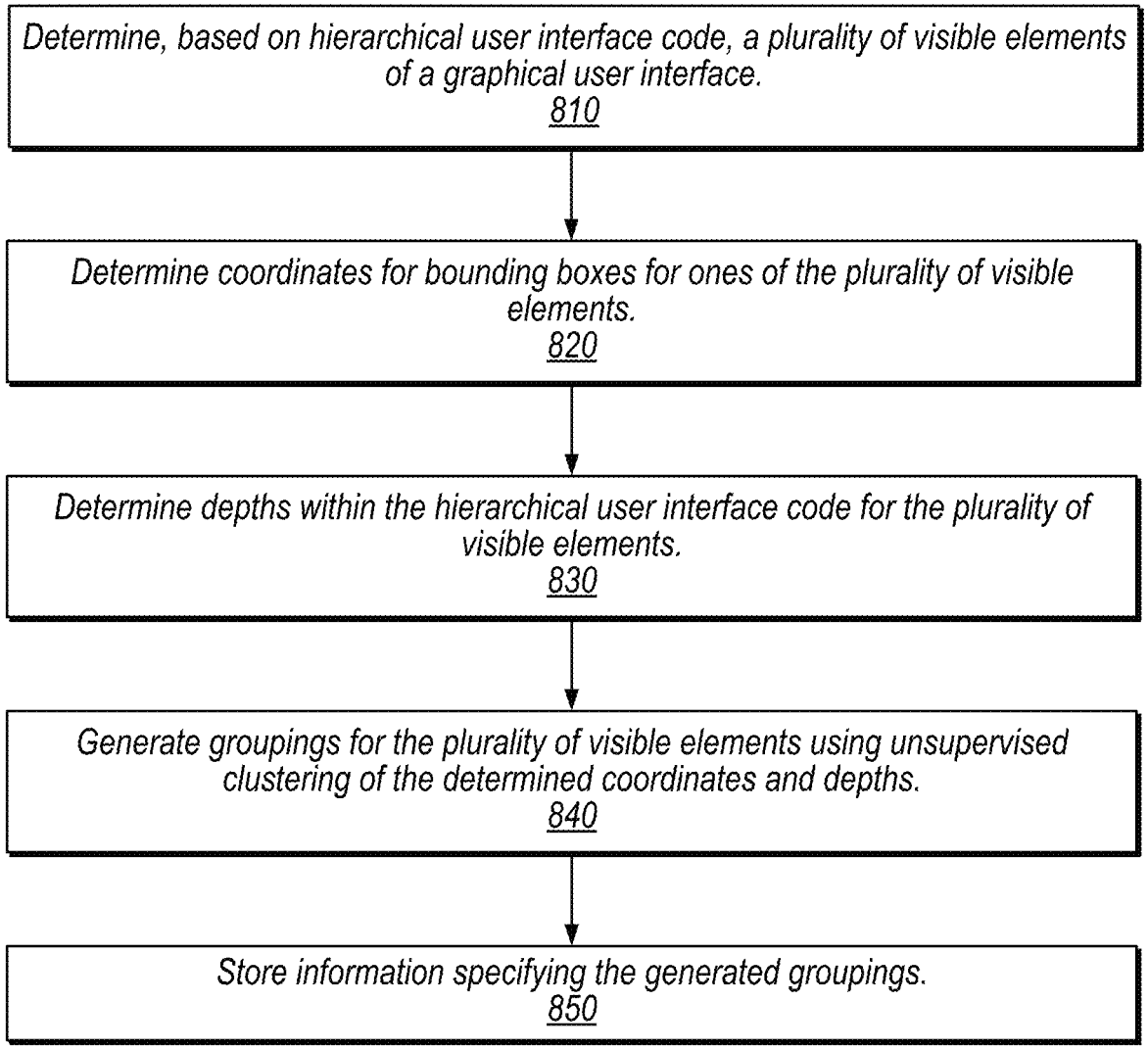
FIG. 8 is a block diagram illustrating an example method for grouping nearby elements of a user interface into components, according to some embodiments.

FIG. 8 is a block diagram illustrating an example method for grouping nearby elements of a user interface into components, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a computing device determines, based on hierarchical user interface code, a plurality of visible elements of a graphical user interface.

At 820, in the illustrated embodiment, the computing device determines coordinates for bounding boxes for ones of the plurality of visible elements. In some embodiments, the coordinates for bounding boxes are horizontal and vertical coordinates in a screen space for the graphical user interface. In other embodiments, three-dimensional bounding regions may be determined, or non-bounding coordinates may be utilized (e.g., a particular point on each element such as the upper left-hand corner).

At 830, in the illustrated embodiment, the computing device determines depths within the hierarchical user interface code for the plurality of visible elements.

At 840, in the illustrated embodiment, the computing device generates groupings for the plurality of visible elements using unsupervised clustering of the determined coordinates and depths. As discussed in further detail below, in some embodiments, based on the groupings, the computing device classifies the plurality of visible elements according to known metadata values for the plurality of metadata fields and information indicating relationships between ones of the known metadata values and a plurality of types of visible user interface elements. In some embodiments, the unsupervised clustering includes performing a k-means clustering process.

At 850, in the illustrated embodiment, the computing device stores information specifying the generated groupings.

In some embodiments, the computing device modifies depth values for ones of the plurality of elements to alter effects of differences in the depth values, relative to effects of differences in the coordinates, in the unsupervised clustering. In some embodiments, modifying the depth values includes applying an exponential function to the depth values. In some embodiments, the computing device determines a similarity metric for first and second groups of visible elements of the graphical user interface.

Example Element Classification Techniques

Figure 9A:
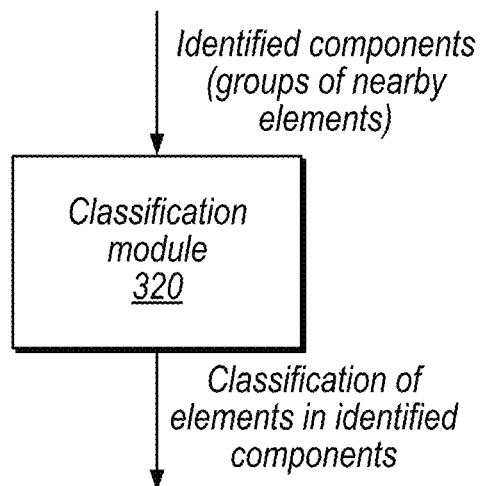
FIGS. 9A and 9B are diagrams illustrating example techniques for classifying elements within an identified component, according to some embodiments.
Figure 9B:
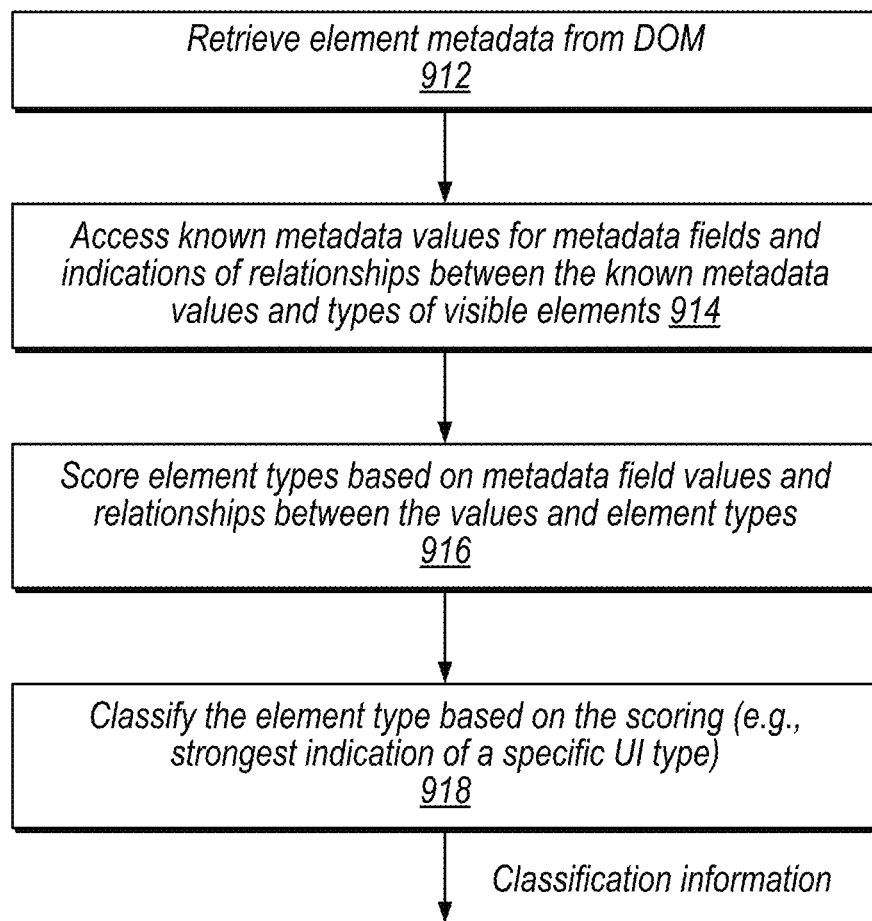

FIGS. 9A and 9B are diagrams illustrating example techniques for classifying elements within an identified component, according to some embodiments. In FIG. 9A, classification module 320 receives identified components from clustering module 310. In the illustrated embodiment, classification module 320 classifies the elements within the identified components and outputs classification information.

At element 912, in the illustrated embodiment, classification module 320 retrieves element metadata from the DOM of one or more existing user interfaces.

At element 914, in the illustrated embodiment, classification module 320 accesses known metadata values for metadata fields and indications of relationships between the known metadata values and types of visible user interface elements. Examples of metadata fields for user interface elements (values for the metadata fields) are discussed below with reference to FIG. 10.

At element 916, in the illustrated embodiment, classification module 320 scores element types based on values of the metadata fields and the relationship between the metadata values and one or more element types. Various scoring values are discussed below with reference to FIG. 10.

At element 918, in the illustrated embodiment, module 320 classifies the element type based on the scoring (e.g., based on the highest score of a specific user interface type for the element). In the illustrated embodiment, module 320 outputs classification information. The classification information generated by module 320 may be used as training data for a machine learning system.

Figure 10:
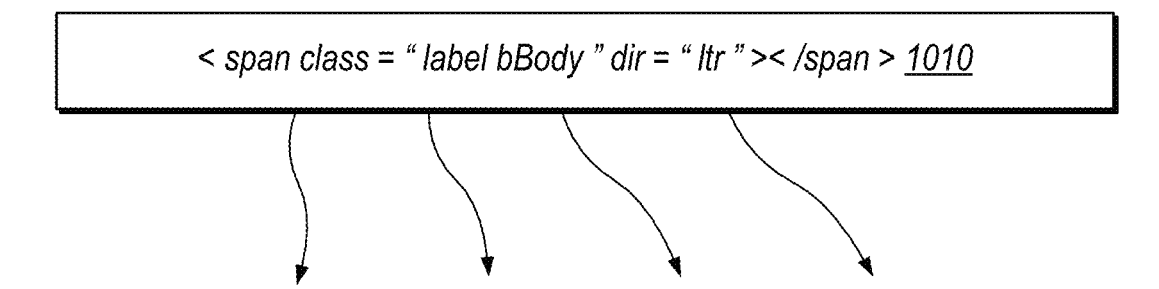
FIG. 10 is a table illustrating example scoring of a visible user interface element for classification based on a plurality of metadata field values, according to some embodiments.

FIG. 10 is a table illustrating example scoring of a visible user interface element for classification based on a plurality of metadata field values, according to some embodiments. In the illustrated embodiment, classification module 320 determines metadata values 1030 for each metadata field 1020 of a visible user interface element 1010. For example, in the illustrated embodiment, "span" is the metadata value for the tag metadata field. In the illustrated embodiment, based on the value 1030 obtained in each field 1020, module 320 awards points to certain element types.

In the illustrated embodiment, three example element types are shown: label 1040, text 1050, and image 1060. In the illustrated embodiment, points are awarded to these three example element types based on values 1030 and indications of relationships between values 1030 and various element types. In some embodiments, classification module 320 stores indications of relationships between metadata values and various element types.

In the illustrated embodiment, a total 1070 is determined based on the total number of points awarded to each example element type. In some embodiments, classification module 320 assigns the highest scoring element type to visible user interface element 1010. In the illustrated embodiment, label 1040 is the highest scoring element type with a total score of 4. Therefore, element 1010 is classified as a label element type in this example.

In some embodiments, a confidence value is determined for the assigned element type based on the scoring of various other element types for a given visible UI element. For example, in the illustrated embodiment, label 1040 received a total score of 4, while text 1050 and image 1060 received total scores of 2 and 0, respectively. In some embodiments, the confidence value for label 1040 is the total score for the label divided by the sum of the scores of all of the element types (label, text, and image in this example). Therefore, in this example, the confidence value for label 1040 is 0.666 or 66.6% (4 divided by 6). In other embodiments, other computations may be performed to generate a confidence value.

In some embodiments, the confidence values may be used as an input when determining component types. For example, if multiple components have been matched to a particular component type and a new component also matches the particular component type except for one element that had a low classification confidence, this may indicate that a new component type should not be added for the new component.

Metadata fields 1020 may contain HTML tags and attributes. For example, an HTML attribute may be one or more of the following: a class A, a class B, a dir, etc. (such as those shown in the illustrated embodiment). Similarly, metadata values 1030 may be HTML attribute values. For example, an HTML attribute value may be one or more of the following: span, label, bBody, ltr, etc. (such as those shown in the illustrated embodiment). In other embodiments, other non-HTML types of metadata fields may be analyzed.

Figure 11:
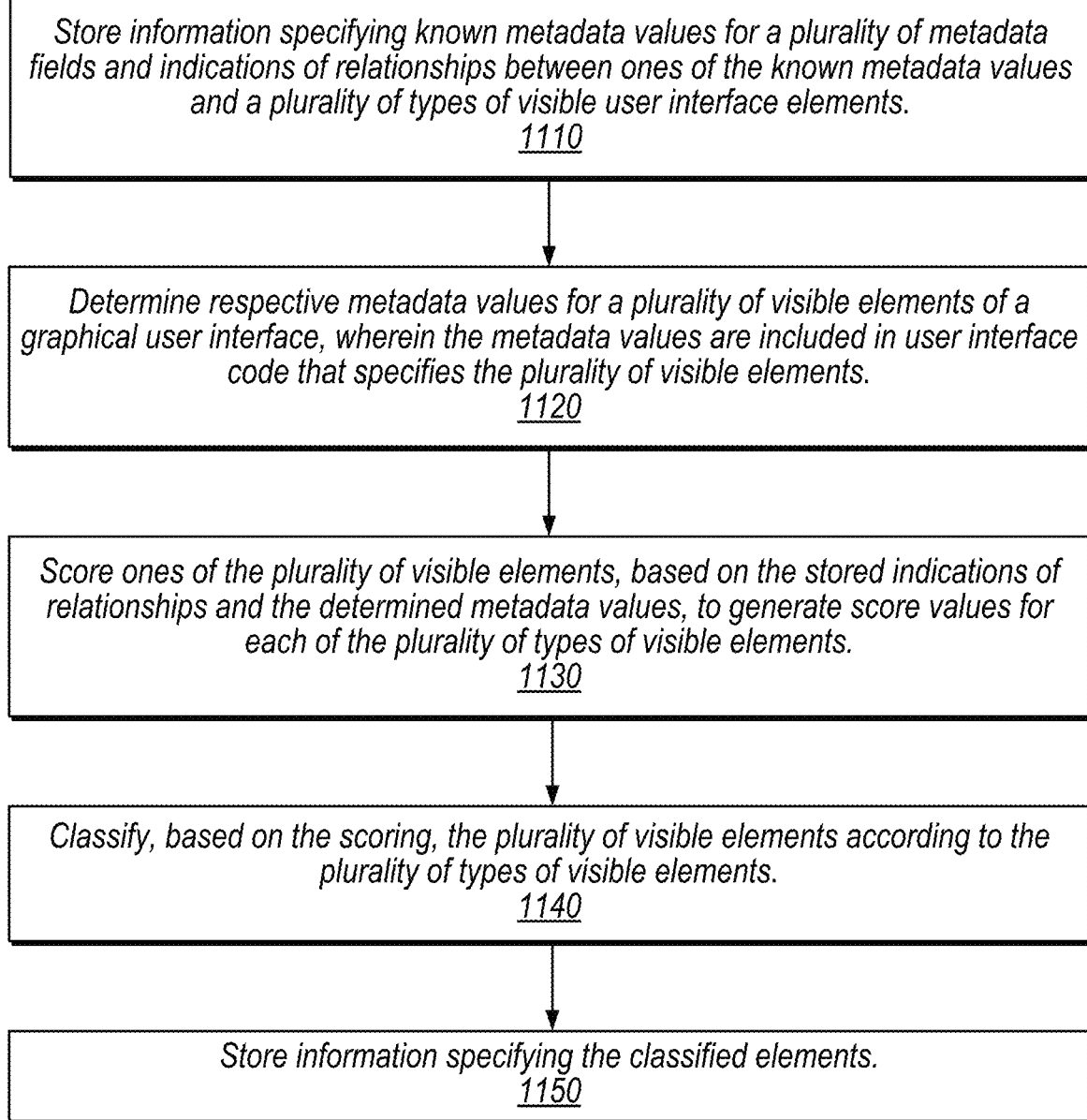
FIG. 11 is a block diagram illustrating an example method for classifying visible user interface elements based on metadata fields, according to some embodiments.

FIG. 11 is a block diagram illustrating an example method for classifying visible user interface elements based on a plurality of metadata fields, according to some embodiments. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1110, in the illustrated embodiment, a computing device stores information specifying known metadata values for a plurality of metadata fields and indications of relationships between ones of the known metadata values and a plurality of types of visible user interface elements.

At 1120, in the illustrated embodiment, the computing device determines respective metadata values for a plurality of visible elements of a graphical user interface, wherein the metadata values are included in user interface code that specifies the plurality of visible elements.

At 1130, in the illustrated embodiment, the computing device scores ones of the plurality of visible elements, based on the stored indications of relationships and the determined metadata values, to generate score values for each of the plurality of types of visible elements. In some embodiments, the scoring is performed separately for different ones of the metadata fields, e.g., as shown in FIG. 10. In these embodiments, each metadata field may receive its own score(s) (e.g., a score for each element type). In some embodiments, the scoring is performed separately for different ones of the plurality of types of user interface elements, e.g., as shown in FIG. 10. In these embodiments, each type may receive one or more of its own scores (e.g., a score for each metadata value). In some embodiments, the types of visible elements include one or more of the following: text, image, or link. In some embodiments, the metadata fields are specified for one or more metadata field types that include: a field that specifies a placement of one or more elements in a user interface, a field that specifies one or more class names for an element, a field that specifies a direction of text content of an element, a field that indicates whether content of an element is editable, a field that indicates whether an element can be dragged, a field that specifies how dragged data behaves when it is dropped, or a field that specifies a language of the content of an element.

At 1140, in the illustrated embodiment, the computing device classifies, based on the scoring, the plurality of visible elements according to the plurality of types of visible elements.

At 1150, in the illustrated embodiment, the computing device stores information specifying the classified elements. In some embodiments, the computing device uses the stored information as training data for one or more machine learning modules configured to automatically generate one or more interfaces. In some embodiments, the computing device uses the classifications as inputs to a module that generates component types based on the classifications.

In some embodiments, the computing device determines whether a set of element types for a first group of elements is the same as a set of element types for a second group of elements. In some embodiments, the computing device determines whether a number of elements of each element type is the same for the first group of elements and the second group of elements. This may facilitate component type identification, for example, if the first and second group of elements correspond to the same component type.

In some embodiments, the computing device determines whether an element displayed at a position within the first group of elements is the same element type as an element displayed at a similar position within the second group of elements. In some embodiments, the computing device determines whether the first group of elements and the second group of elements have at least a threshold similarity, based on determining whether a set of element types for the first group of elements is the same as a set of element types for the second group of elements the determining whether a number of elements of each element type is the same for the first group of elements and the second group of elements.

In some embodiments, the computing device determines and stores a confidence value associated with classification of one of the classified elements, where the determination is based on scores for multiple different types of elements generated for the one of the classified elements. In some embodiments, the confidence value is determined based on a ratio of the score for a classified type for the classified element to a sum of scores for all scored types for the classified element.

Example Component Type Identification Techniques

Figure 12A:
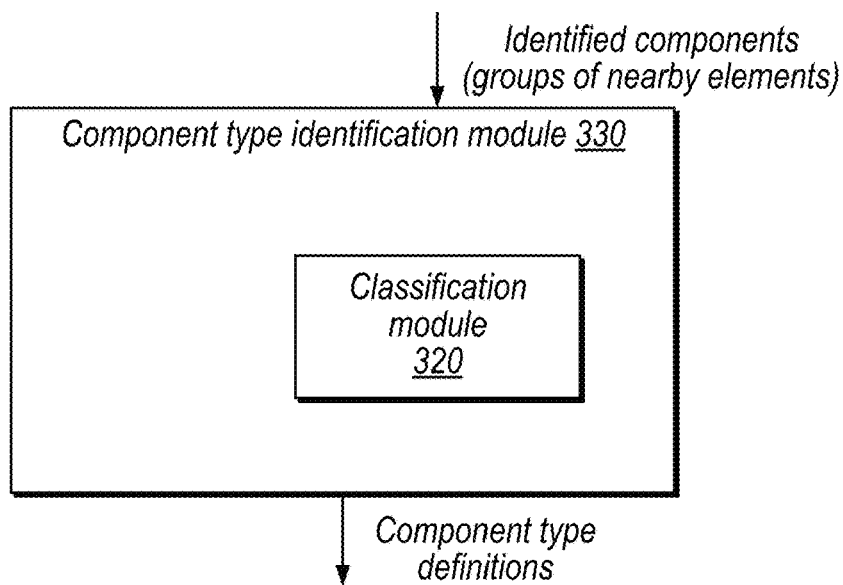
FIGS. 12A and 12B are diagrams illustrating example techniques for identifying types of identified interface components, according to some embodiments.
Figure 12B:
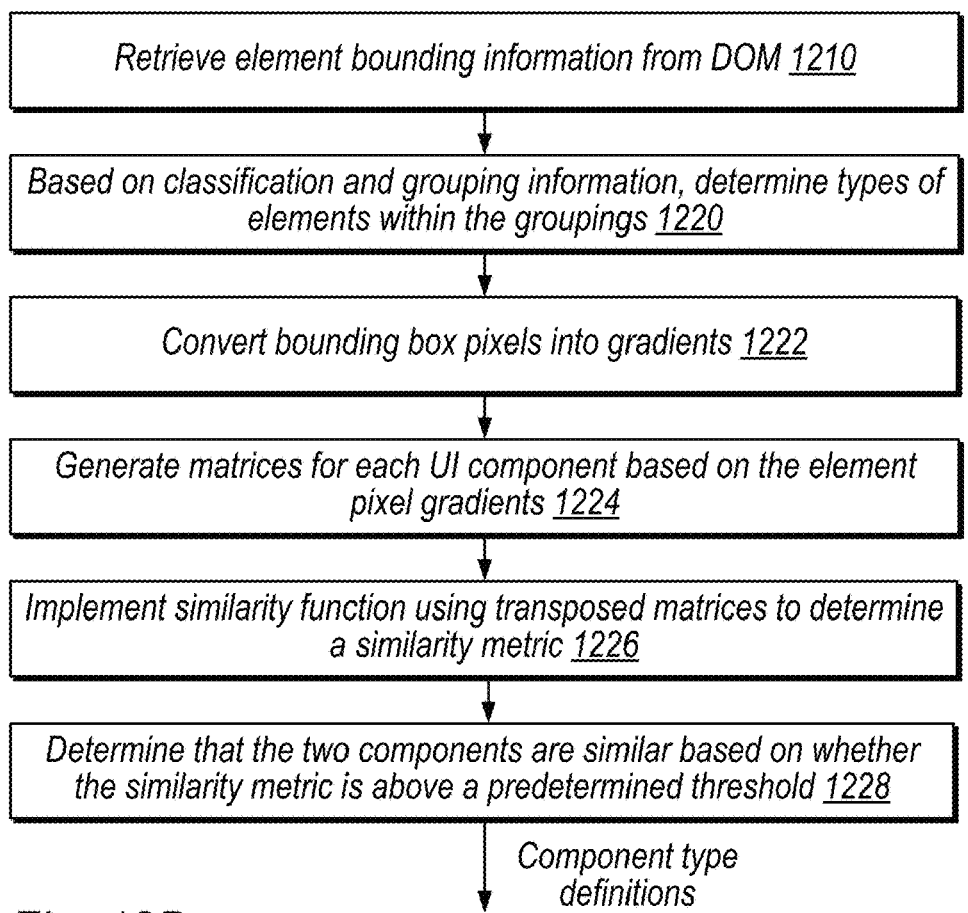

FIGS. 12A and 12B are diagrams illustrating example techniques for identifying types of identified interface components, according to some embodiments. In FIG. 12A, component type identification module 330 receives identified components (e.g., groups of nearby elements) from clustering module 310. In the illustrated embodiment, component type identification module 330 uses classification information from classification module 320 to determine whether two components are similar. The techniques discussed below with reference to FIG. 12B are one non-limiting example of geospatial analysis for detecting component types.

In some embodiments, classification module 320 is separate from component type identification module 330. In the illustrated embodiment, module 330 outputs component type definitions, based on a determination of similarity between processed components.

At element 1210, in the illustrated embodiment, module 330 retrieves element bounding information (e.g., element bounding boxes), from the DOM of one or more existing user interfaces, for the leaf elements corresponding to visible nodes.

At element 1220, in the illustrated embodiment, module 330 determines types of elements within the groupings of elements, based on classification information from module 320 and grouping information from module 310. Determining element types within components is discussed below with reference to FIG. 13.

At element 1222, in the illustrated embodiment, module 330 generates gradients based on pixels of the element bounding boxes. In some embodiments, the gradient is based on the total number of pixels in the component that the element is grouped in (e.g., the number of pixels in the gradient for each element is relative to the total number of pixels in the component). In some embodiments, the pixel gradient is generated based on the resolution of the component that the element belongs to. Example bounding box pixel gradients are discussed below with reference to FIG. 15.

At element 1224, in the illustrated embodiment, module 330 generates matrices for each user interface component based on the pixel gradients of the elements within the components. At element 1226, in the illustrated embodiment, module 330 implements a similarity function using transposed matrices to determine a similarity metric (e.g., a similarity ratio). Matrix data structures for pixel gradients and implementation of a similarity function are discussed below with reference to FIG. 16.

At element 1228, in the illustrated embodiment, module 330 determines that the two components are similar based on whether the determined similarity metric is at or above a predetermined threshold. In the illustrated embodiment, at element 1228, module 330 outputs component type definitions for user interface components.

Figure 13:
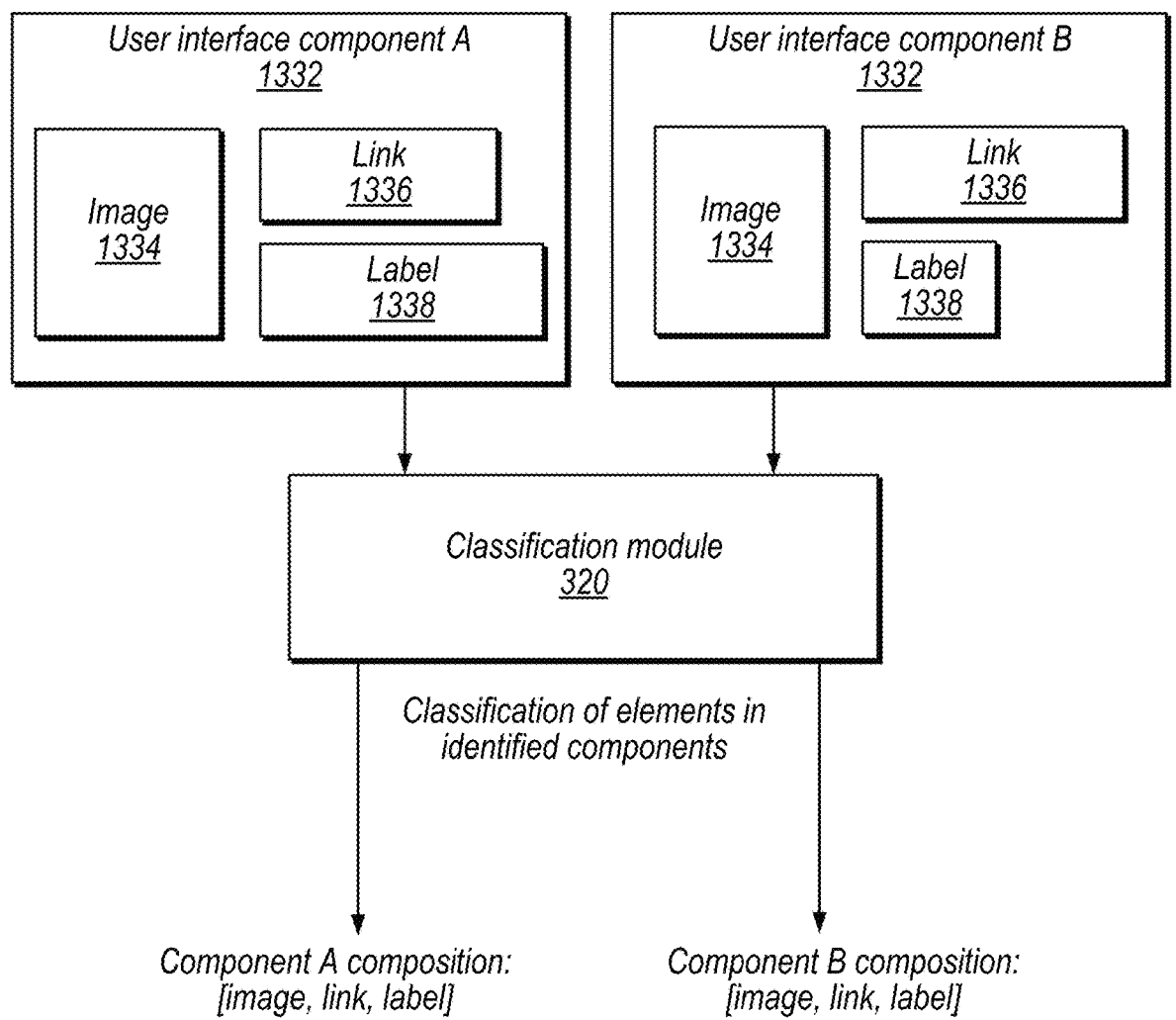
FIG. 13 illustrates example classification of two user interface components by a classification module within a component type identification module, according to some embodiments.

FIG. 13 illustrates example classification of two user interface components by a classification module within a component type identification module, according to some embodiments. In the illustrated embodiment, component type identification module 330 compares two user interface components A and B 1332 with assistance from classification module 320 to determine the composition of the two interface components.

In some embodiments, a match between the types of elements within two different components (e.g., a match between the two compositions) is determined by classification module 320. In some embodiments, the match is determined by the number of elements of each element type that are the same for the two components. In addition, the position of the elements within the two components may be a factor in determining a match between two components. For example, component A has an image, link, and label positioned at similar locations as the image, link, and label of component B. In this example, classification module 320 may determine that the compositions of component A and component B are similar and therefore, that the two compositions match.

In some embodiments, based on the compositions output by module 320, component type identification module 330 determines whether to calculate a similarity metric for the two components. Module 330 may allow some differences between the compositions of components 1332. For example, a given component type may have an image and one to three text elements (such that different components of the same type can have different numbers of text elements). Similarly, a determined type of component may be allowed an omission of one or more element types that are included in another component of the same type.

Note that, in the illustrated example, the sizes of the link 1336 and label 1338 in the two components differ in width (e.g., the bounding boxes of the two elements are different sizes), which may affect the value of a similarity metric, but does not affect the composition of elements in each component. In some embodiments, the classification is used as a filter. For example, further analysis may proceed to determine component types only if each type of element in one component is also represented in the other component. In some embodiments, analysis may proceed only if each component includes the exact same number of elements of each type. In other embodiments, the classifications may not be used as a filter but may be another input to the determination of a similarity metric.

Figures 14A, 14B:
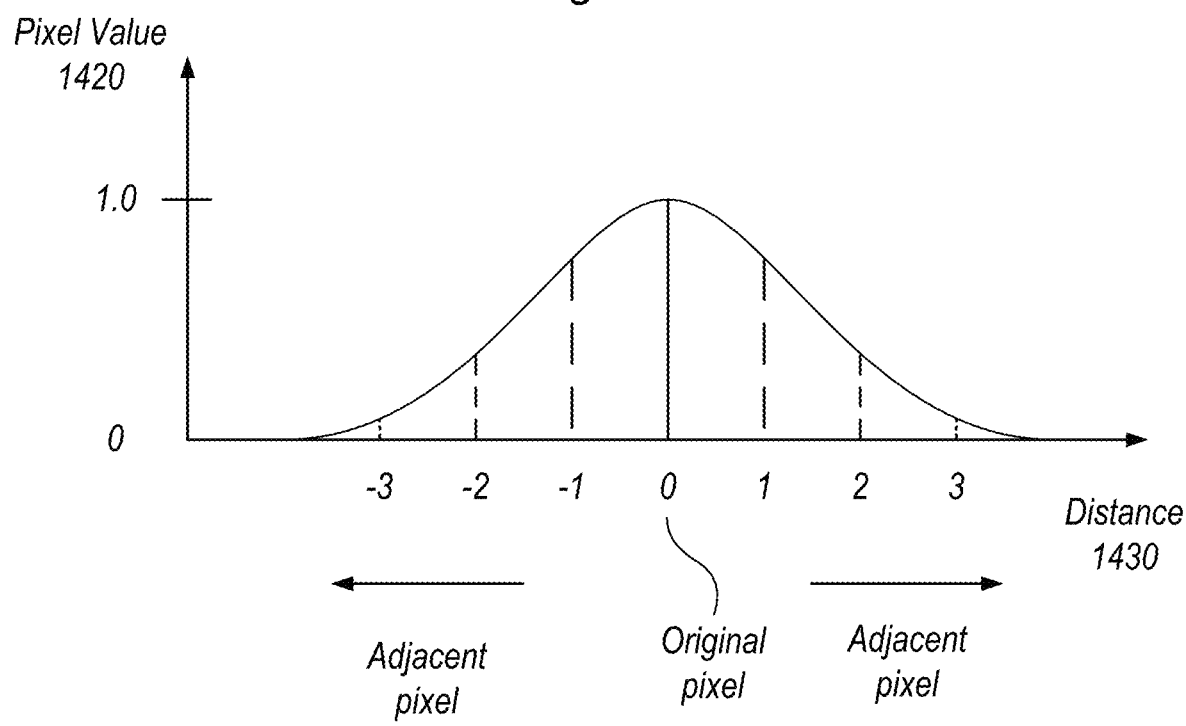
FIGS. 14A and 14B illustrate example pixel characteristics for generating a pixel gradient, according to some embodiments.

FIGS. 14A and 14B illustrate example pixel characteristics for generating a pixel gradient, according to some embodiments. The pixel characteristics shown in the illustrated embodiment are used by component type identification module 330 to determine a similarity metric (e.g., a ratio) for components A and B 1332, once module 330 has determined that the compositions of the two components match (e.g., based on the output of module 320).

In FIG. 14A, a table is shown with two columns representing the pixel color 1410 and the pixel value 1420. In the left column, the pixel color 1410 may be one of four options: white/empty, light gray, dark gray, or black. In the right column, in the illustrated embodiment, a pixel value is shown for each of the four pixel colors as 0, 0.33, 0.66, and 1, respectively.

The pixel colors may include various levels of granularity in the spectrum between white and black. For example, there may be two additional colors in the gradient from white to black, such as very light gray and very dark gray with pixel values 0.165 and 0.83, respectively.

In FIG. 14B, a plot of pixel gradient values in relation to their distance from an adjacent pixel is shown. In the illustrated embodiment, the y-axis of the graph represents the pixel value 1420, while the x-axis represents the distance 1430 between adjacent pixels. In the illustrated example, the original pixel is a black pixel color 1410 with a pixel value of 1. Further, in the illustrated example, the pixels adjacent to the original pixel decrease in value as the distance 1430 between the original pixel and adjacent pixels increases. For example, the pixel located at 2 on the x-axis has a pixel value of 0.33 (e.g., a light gray pixel color).

Various techniques other than a pixel gradient may be used to process a similarity metric for two components. For example, in some embodiments, a geometric process is used to determine a similarity metric for two components based on the perimeter, total width, or length of bounding boxes of elements included in the two components. In another geospatial analysis example, the total area inside element bounding boxes may be used to determine a similarity metric for two components.

Figure 15:
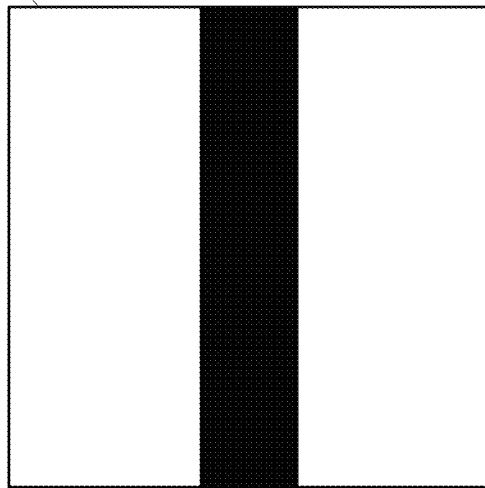
FIG. 15 illustrates an example technique for generating pixel gradients for the bounding boxes of user interface elements within a component, according to some embodiments.

FIG. 15 illustrates an example technique for generating pixel gradients for the bounding boxes of user interface elements within a component, according to some embodiments. In the illustrated embodiment, component type identification module 330 begins converting pixel values of element bounding boxes into a pixel gradient. In the illustrated embodiment, a visual representation of a pixel line of an element bounding box is represented by bounding box portion 1520. In the illustrated embodiment, the original pixels of the bounding boxes are black with a pixel value of 1 (shown as the black pixel line in the center of portion 1520). In the illustrated embodiment, the bounding boxes are converted to a pixel value representation displayed in table #1.

Once the bounding boxes of elements grouped within components are converted to a pixel value representation, in the illustrated embodiment, a gradient is then applied to the pixel representation. Table #2, in the illustrated embodiment, displays the pixel representation of the gradients.

In some embodiments, the number of pixels included in the gradient (e.g., the pixel values to the left and right of the original element bounding box pixel in tables #1 and #2) is determined based on the total size and/or resolution of the component. For example, if the size and/or resolution of the component is larger the gradient may include a large number of pixels to the right and left of the original element bounding box pixel, effectively causing the bounding box to appear relatively thinner.

Figure 16:
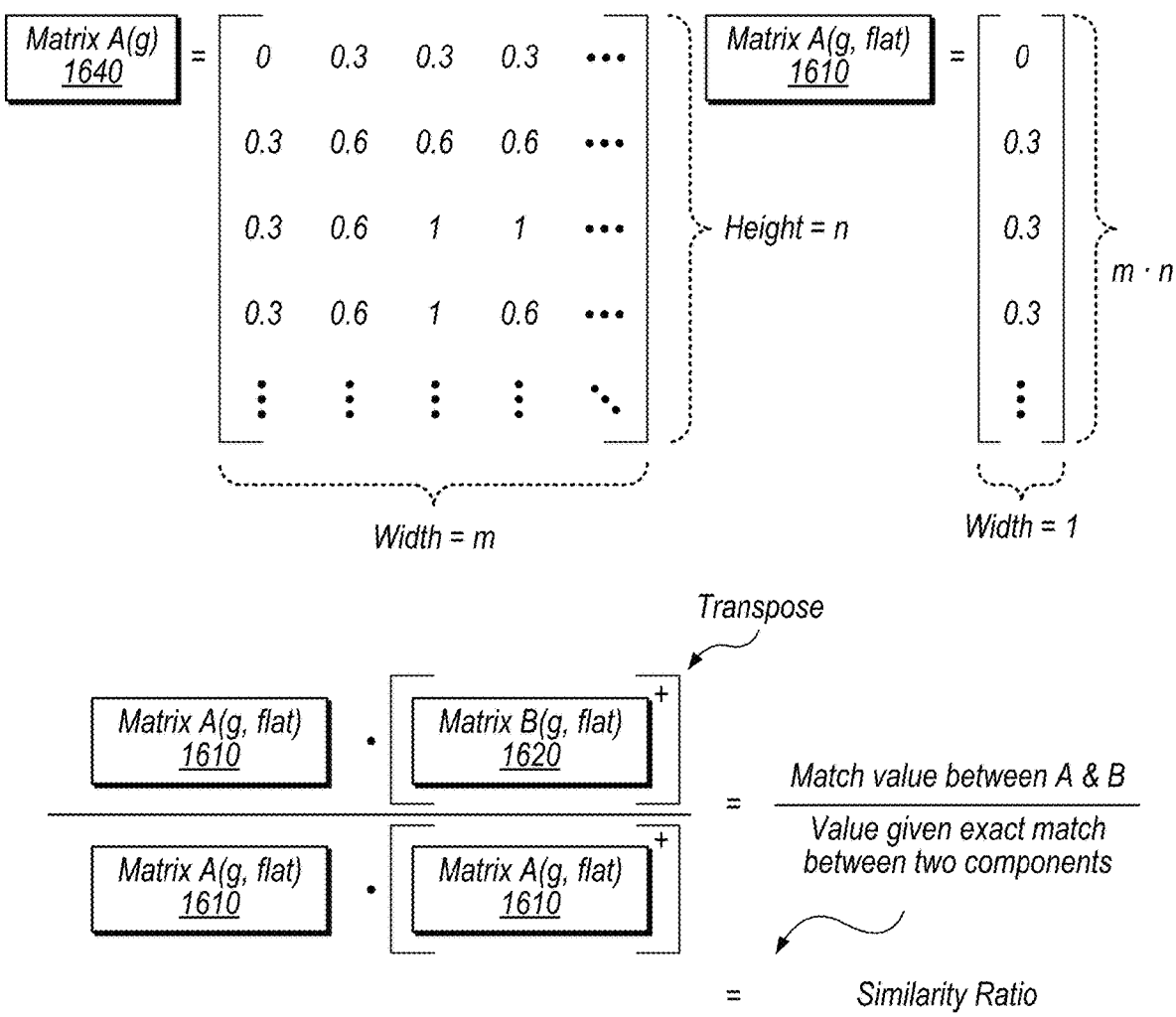
FIG. 16 illustrates an example technique for determining a similarity metric for two components based on pixel matrices representing gradients, according to some embodiments.

FIG. 16 illustrates an example technique for determining a similarity metric for two components based on pixel representations of bounding boxes, according to some embodiments. In the illustrated embodiment, the pixel gradients for a first component A are placed in a matrix A(g) 1640 with width m and height n. In the illustrated embodiment, the matrix A(g) 1640 is flattened creating a matrix with width 1 and height n (matrix A(g, flat) 1610). A matrix for a second component B is also generated and flattened to produce a flattened matrix 1620 with a single column.

As used herein, the term "flatten" refers to one or more matrix operations that covert a matrix into a vector. For example, in disclosed embodiments, flattening a matrix refers to the operation of stacking one or more columns of the matrix on top of each other to form a single column with multiple rows. Thus, in this stacking technique, the upper n entries of the flattened matrix correspond to the first column of the original matrix, the next n entries correspond to the second column of the original matrix, and so on. For an M by N matrix, the corresponding flattened matrix has a size of M times N by 1. Flattening may also be performed in row major order to form a single row with multiple columns.

In some embodiments, the matrix representations of the portions of the bounding boxes for two components are not the same size (e.g., the height and/or width of the matrices are different). For example, one of the matrices may be smaller than the other. In some embodiments, the smaller matrix is padded with zeroes in order to match the dimensions of the other matrix.

In the illustrated embodiment, a mathematical formula is implemented to determine a similarity metric for the two components. In the illustrated embodiment, the dot product of matrix A(g, flat) and transposed matrix B(g, flat) is calculated, producing a match value between components A and B 1332. In some embodiments, the match value represents a similarity between components A and B. In the illustrated embodiment, the dot product of matrix A(g, flat) and transposed matrix A(g, flat) is calculated to produce a value associated with an exact match. The first dot product is then divided by the second, to generate a similarity ratio for components 1332, in the illustrated example.

In some embodiments, if the similarity ratio is above or equal to a predetermined threshold, the two components are considered similar. Note that various different ratio values may be used for the predetermined threshold. For example, if predetermined threshold is 80%, the similarity ratio must be greater than or equal to 80% in order for two components to be considered similar.

In some embodiments, based on the similarity ratio meeting the predetermined threshold, module 330 assigns the same component type to the two compared components. In some embodiments, this assignment is called the component type definition. In some embodiments, the assignment of the same component type to multiple components may advantageously prevent the production of duplicate components using different code. In addition, the assignment of a type to one or more components may advantageously decrease search time for the identified components in other existing user interfaces and thereby improve training data used to train a machine learning system. Note that, for a set of identified components, various techniques may be used to search for matches within the components to generate a corresponding set of component types. For example, each component may be compared with every other component, or once a component type is identified, other components may be compared with a single representative component of the identified component type.

Figure 17:
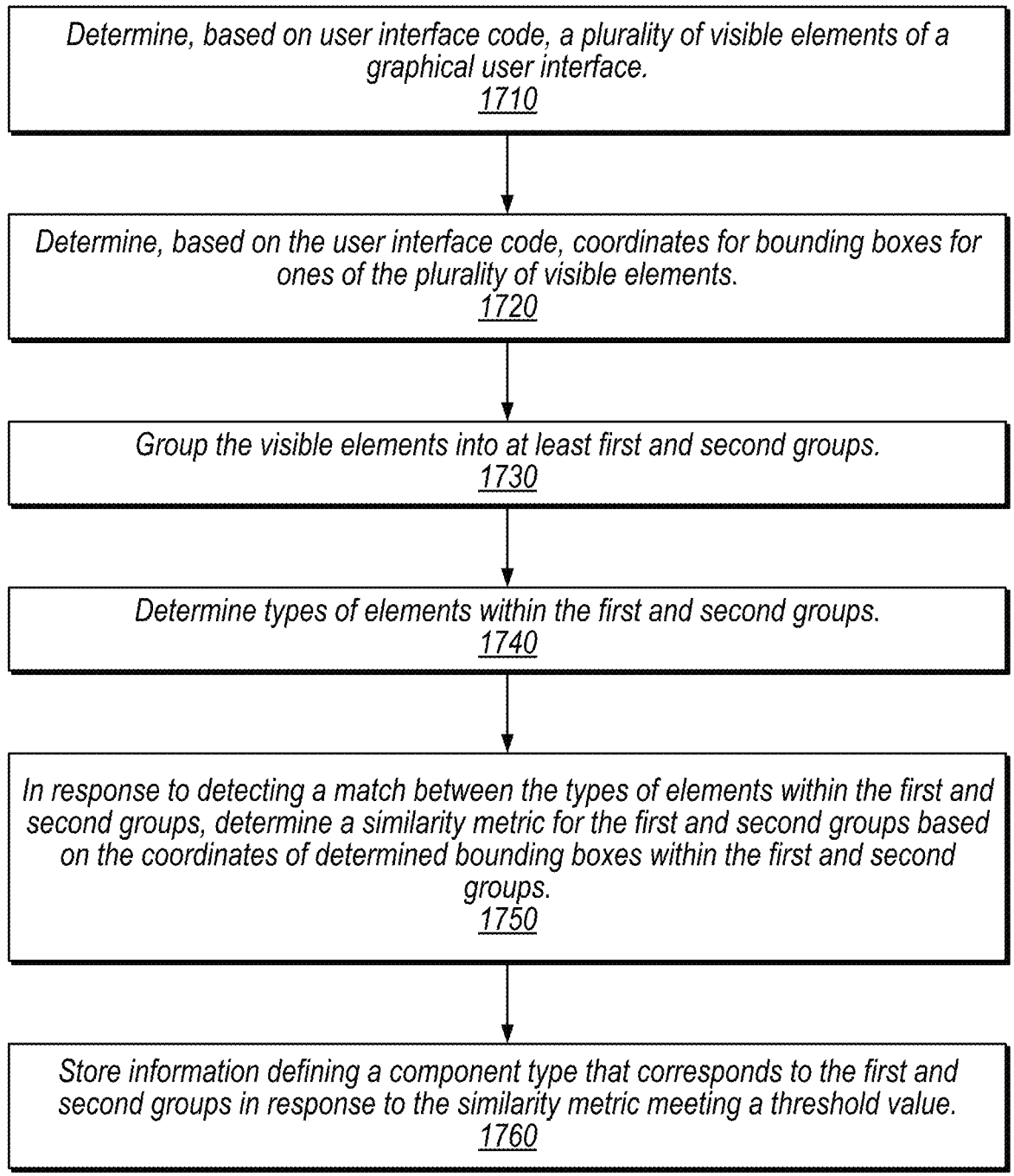
FIG. 17 illustrates an example method for identifying types of user interface components, according to some embodiments.

FIG. 17 illustrates an example method for identifying types of user interface components, according to some embodiments. The method shown in FIG. 17 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1710, in the illustrated embodiment, a computing device determines, based on user interface code, a plurality of visible elements of a graphical user interface.

At 1720, in the illustrated embodiment, the computing device determines, based on the user interface code, coordinates for bounding boxes for ones of the plurality of visible elements.

At 1730, in the illustrated embodiment, the computing devices groups the visible elements into at least first and second groups.

At 1740, in the illustrated embodiment, the computing device determines types of elements within the first and second groups.

At 1750, in the illustrated embodiment, in response to detecting a match between the types of elements within the first and second groups, the computing device determines a similarity metric for the first and second groups based on the coordinates of determined bounding boxes within the first and second groups. In some embodiments, the computing device detects a match by determining whether a number of elements of each element type is the same for the first group of elements and the second group of elements. In some embodiments, the computing device detects a match by determining whether an element displayed at a position within the first group of elements is the same element type as an element displayed at a similar position within the second group of elements.

In some embodiments, the similarity metric is determined based on respective pixel representations for the first and second groups. In some embodiments, the pixel representations are based on the determined bounding boxes for ones of the plurality of visible elements. In some embodiments, the pixel representation is based on ones of the plurality of visible elements of the graphical user interface.

In some embodiments, the pixel representations for the first and second groups are represented using respective matrix data structures. In some embodiments, the computing device flattens the matrix data structures for the first and second groups. In some embodiments, the computing device transposes the flattened matrix data structures for the first and second groups.

In some embodiments, the computing device determines a first dot product of the flattened matrix data structure for the first group and the transposed matrix data structure for the second group. In some embodiments, the computing device determines a second dot product of the flattened matrix data structure for the first group and the transposed matrix data structure for the second group. In some embodiments, the computing device calculates a result of the similarity metric based on a ratio between the first dot product and the second dot product. In some embodiments, the first dot product corresponds to a similarity between the first and second groups of elements and the second dot product corresponds to a value associated with an exact match.

At 1760, in the illustrated embodiment, the computing device stores information defining a component type that corresponds to the first and second groups in response to the similarity metric meeting a threshold value.

As discussed in detail below, identified component types may be used as building blocks to automatically generate other user interfaces, in some embodiments.

Identifying Duplication Interface Design

In some embodiments, techniques similar to those discussed above for determining component types may be used to identify interface design that is at least partially duplicated at different parts of an interface. In some embodiments, this may include grouping elements into components, and identifying similarity between components based on one or more comparison techniques. Comparison techniques may include comparing bounding boxes, comparing actual visual representations, comparing classified elements within components, etc.

Consider, for example, a first component with an image, a link with a user name, a title, and a label for a team member and a second component with an image, a link with text for a user name and record name, an event, and a label for an event. The first component may be for Jane Doe, the VP of strategic events who is labeled as a manager. The second component may be for updating a record, performed by John Smith on a certain date. These two components may have substantially the same visual and/or coding design, however, even though they are used to display different types of information, and this duplicate design may be automatically identified and reported, in some embodiments.

In some embodiments, these techniques may advantageously identify duplicate design, which may allow for automatic code merging or allow an admin to make coding decisions based on the detected duplication. In some embodiments, an administrator may design a component and submit it to a duplication detection engine, which may identify existing components in an interface that meet a similarity threshold.

In some embodiments, for comparing bounding boxes and/or visual representations, a geospatial database may be used. For example, the database may store existing components and may be queried to detect similarities between stored components and a provided component. One non-limiting example of such a geospatial database include a postgres/postgis database. In other embodiments, non-database techniques may be used for geospatial analysis, e.g., such as the techniques discussed with reference to FIGS. 15-16. In some embodiments, searching for duplicate components to generate a duplication report is performed using a bi-directional long short-term memory (LSTM) recurrent neural network (RNN).

In some embodiments, classification module 320 may identify element types within components being compared to generate a similarity value. Note that code regions identified by a duplicate design identification module may or may not be similar enough to be considered the same component type. For example, a 75% match may be considered sufficient to flag design duplication, but may not be sufficient to classify two components as the same component type.

In some embodiments, both element classification and geospatial analysis may be used in combination to detect duplicate design.

The inputs to the duplicate design identification module may include a crawled web application then a DOM or sketch file, for example and the module may output information identifying similar patterns in the crawled web application. The disclosed techniques may be used by developers to search for existing code blocks and/or designers to search for existing component designs and may reduce customization of redundant components.

In some embodiments, based on a duplication report for existing components, one or more components from the report are mapped to a databased field. In some embodiments, the one or more mapped components may advantageously allow an interface generator module to automatically select one or more components from a database to generate a new user interface. In some embodiments, generating a duplication report for similar existing user interface components may advantageously decrease development time for one or more future interfaces (e.g., developers are aware of which components/code blocks already exist).

Figure 18:
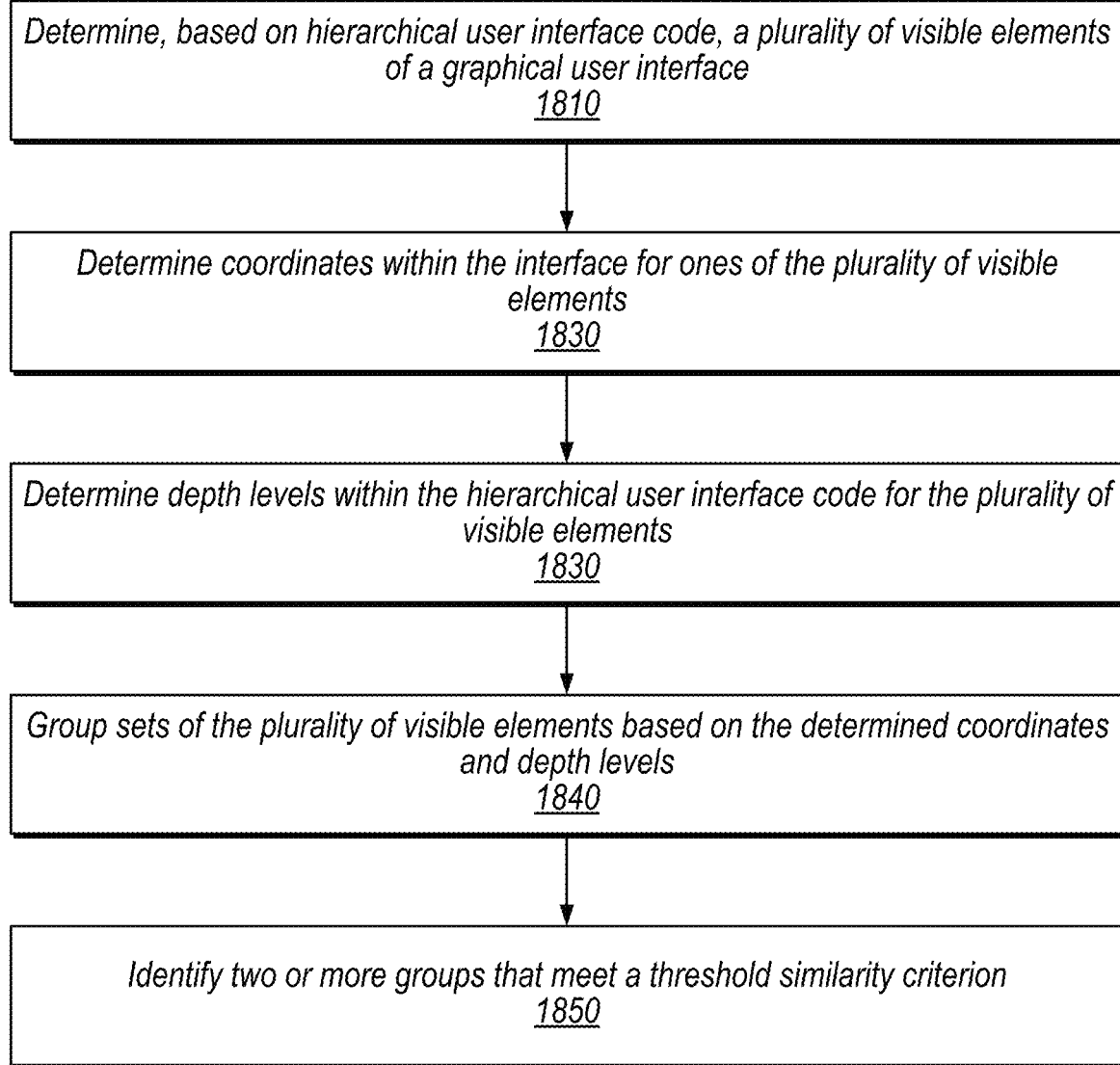
FIG. 18 is a flow diagram illustrating an example method for identifying duplicate interface regions, according to some embodiments.

FIG. 18 is a flow diagram illustrating an example method for identifying duplicate interface design, according to some embodiments. The method shown in FIG. 18 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1810, in the illustrated embodiment, a computing system determines based on hierarchical user interface code, a plurality of visible elements of a graphical user interface. These may be leaf nodes in a DOM representation, for example.

At 1820, in the illustrated embodiment, the computing system determines coordinates within the interface for ones of the plurality of visible elements. The coordinates may correspond to points associated with a given element (e.g., the center or corner of an element) or other shapes such as bounding boxes of visual representations of the element or points associated with such visual representations.

At 1830, in the illustrated embodiment, the computing system determines depth levels within the hierarchical user interface code for the plurality of visible elements. Speaking generally, elements at similar depths may be more likely to be grouped, in some embodiments.

At 1840, in the illustrated embodiment, the computing system groups sets of the plurality of visible elements based on the determined coordinates and depth levels. In some embodiments, the system determines one or more component types for the groups of elements. Groups corresponding to the same component type may be identified as meeting a threshold similarity criterion (although a different, e.g., higher threshold may be used for identifying similarity and component types in other embodiments).

At 1840, in the illustrated embodiment, the computing system identifies two or more groups that meet a threshold similarity criterion. The computing system may generate a report that identifies the groups. In some embodiments, the computing system automatically merges code for groups that meet the threshold criterion. For example, the system may generate a class or component type for the groups such that a developer can change the class or component type once to adjust multiple corresponding code segments.

The identification may be based on classification of elements and/or geospatial analysis.

Example Interface Generator Techniques

Figure 19:
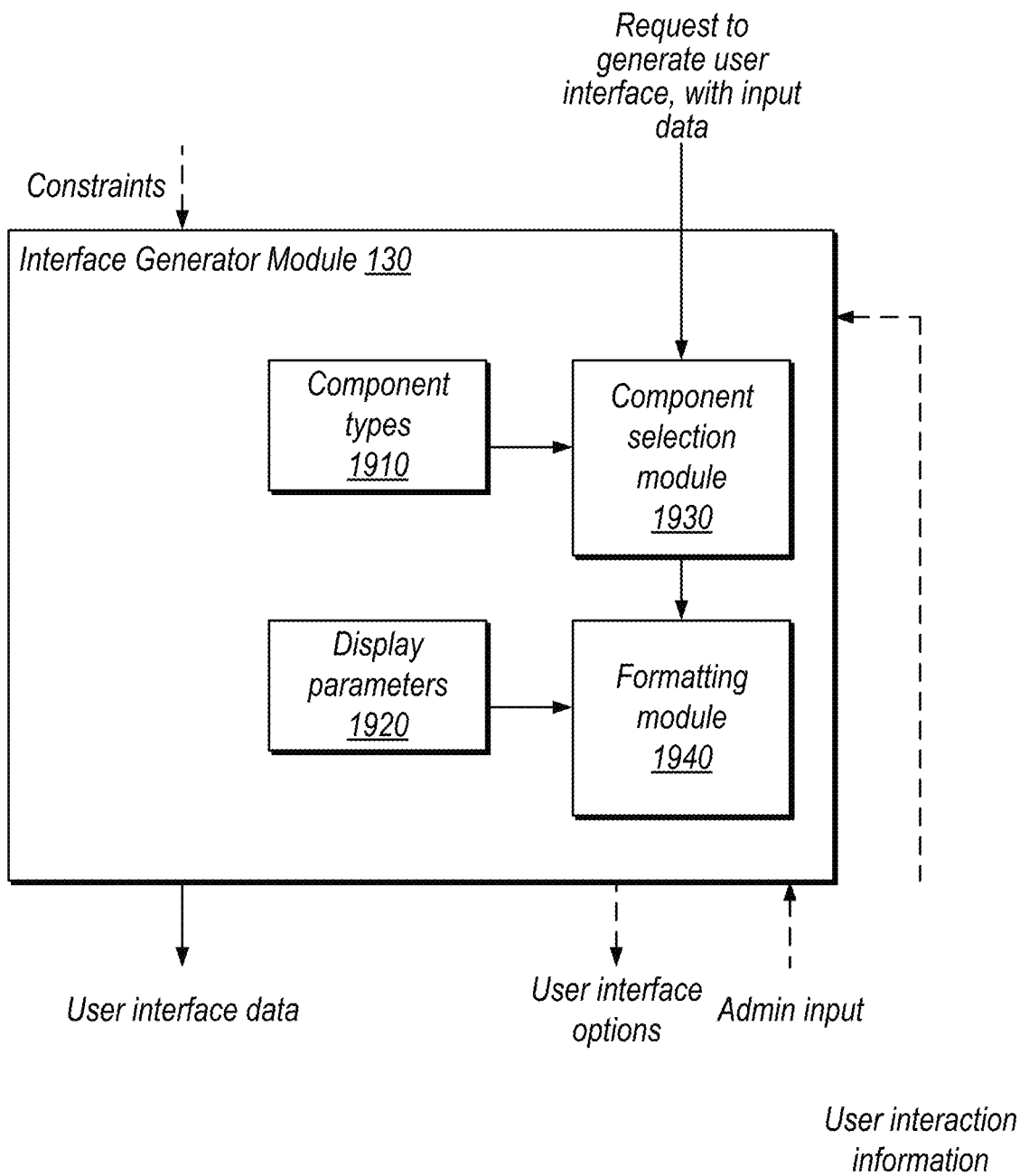
FIG. 19 is a block diagram illustrating a more detailed example of the interface generator module shown in FIG. 1, according to some embodiments.

FIG. 19 is a block diagram illustrating an interface generator module, according to some embodiments. In the illustrated embodiment, module 130 stores component types 1910 and display parameters 1920. This information may be automatically generated based on existing interfaces and/or user specified. For example, grouping module 120 may generate this information and/or a user may generate or modify the information. Component types are discussed in detail above. Display parameter 1920, in some embodiments, indicate formatting within components and/or among components, and may indicate additional information such as fonts, colors, etc.

In the illustrated embodiment, module 130 includes a component selection module 1930 and a formatting module 1940.

Component selection module 1930, in some embodiments, is configured to receive input data for a user interface and automatically select one or more component types to represent the user input data. The input data may be in Javascript Object Notation (JSON) format, for example, or some other organization. The input data may not, however, specify how it is to be displayed. In some embodiments, component selection module 1930 is configured to determine element types in the input data and match those types to element types in known component types 1910. Based on this matching, component selection module 1930 may select one or more component types.

Note that, for a given set of input data, component selection module 1930 may select multiple component types as discussed below with reference to FIG. 20. In some embodiments, component selection module 1930 may select one or more component types that provide the best match for the input data, even if the types of elements are not an exact match.

Formatting module 1940, in the illustrated embodiment, is configured to format the components according to the selected component types and display parameters 1920. In some embodiments, the formatting is based on additional constraints, such as screen resolution, screen size, display technology, specified fonts, etc. Module 1940 may layout selected components, format multiple components, layout elements within selected components, and/or format within selected components. In some embodiments, formatting module 1940 is configured to output user interface data, and may cause display of an interface based on the user interface data. Formatting may include positioning, color, font, spacing, layout, size, rotation, transparency, borders, etc. within and/or among components. In some embodiments, the display parameters 1920 may include information indicating positioning of certain component types in prior interfaces, which may be used to position corresponding components in automatically generated interfaces.

As discussed in further detail below, component types 1910, display parameters 1920, module 1930, and/or module 1940 may be modified based on user input and/or interface interaction. For example, module 130 may present component type and/or formatting options to an administrator, who may select desired options. In some embodiments, modules 1930 and/or 1940 implement one or more machine learning engines that may be trained to provide more desirable outputs based on administrator input. Similarly, information regarding user interaction with the interface such as time spent on portions of the interface, selection activity (e.g., clicking), etc. may be used to train these modules (and/or other modules discussed herein).

Figure 20:
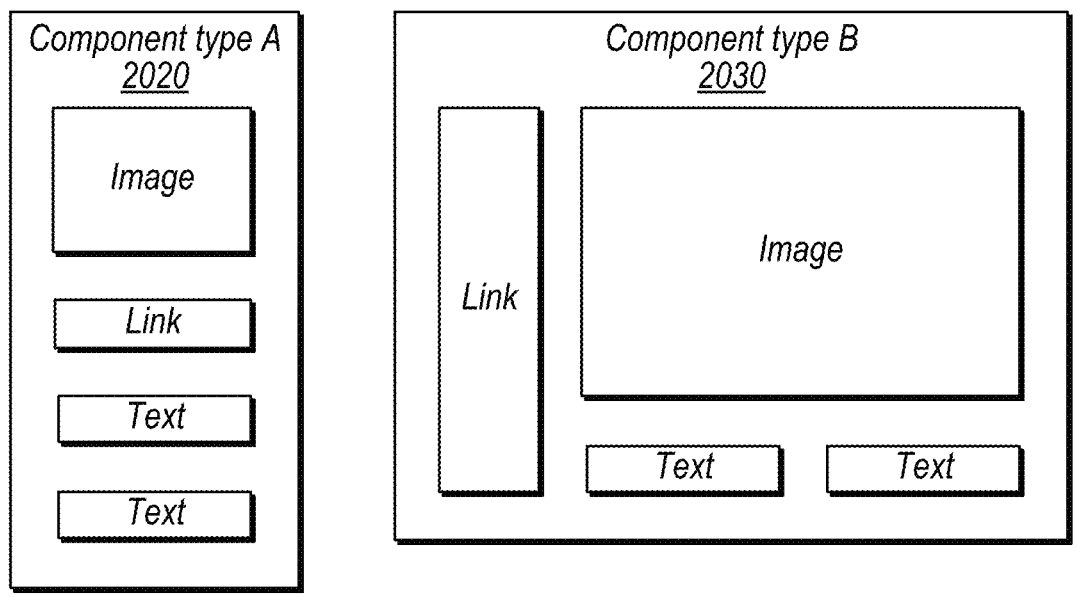
FIG. 20 is a diagram illustrating two example component types identified for a set of input data, according to some embodiments.

FIG. 20 illustrates two example component types selected for a set of input data 2010, according to some embodiments. In the illustrated embodiment, a set of input data 2010 for an article includes a link to the article, two separate text elements (describing the article and providing a date of the article), and an image from the article. For example, a component based on this data may be displayed on a front page of a web interface and selectable to read the article. In the illustrated embodiment, module 130 may select two component types A and B 2020 and 2030 for this input data. As shown, the two component types have the same set of element types but are formatted quite differently. Module 130 may select a final component based on user input or based on control by formatting module 1940, for example. In some embodiments, a user may enter a set of data to be displayed and search for matching component types. The system may display multiple potential component types and allow the user to select a preferred type.

In some embodiments, generating user interfaces using automatic techniques may advantageously decrease maintenance and/or migration of user interfaces, thereby preventing a build-up of user interface code from previously existing user interfaces. Further, automatically generating interfaces may be advantageous by allowing differences in interfaces generated by the same interface module. For example, for different languages with different average word lengths, module 130 may generate different interfaces for the same underlying information, to better display the information in different languages.

In some embodiments, the interface generator module 130 generates user interface data based on voice interactions. For example, after receiving instructions from a user through voice interactions, module 130 may generate a user interface that summarizes the interactions, thereby allowing the user to confirm or modify the interactions. In some embodiments, the user interface summary of the voice interactions may advantageously allow the user to provide accurate instructions while driving, walking, etc. with a small amount of interaction required through touch (e.g., screen clicking). In some embodiments, interface generator module 130 generates a user interface for one or more of the following display technologies: a graphical user interface, a voice user interface (VUI), virtual and/or augmented reality (VR/AR), head-up display (HUD), etc. In some embodiments, the target output platform may be an input constraint that is used in selecting component types. For example, some component types may be determined to be more desirable for augmented reality than for a traditional display.

In some embodiments, the interface generator module 130 may provide a seamless experience across multiple types of output devices and may automatically select one or more output types to display certain components automatically. For example, based on context parameters, module 130 may decide to output a first component via a monitor and audibly, but output a second component via augmented reality only.

In some embodiments, the disclosed techniques may facilitate integration of external services into an existing interface. For example, the disclosed techniques may be used to automatically format interfaces with data from the external database to maintain the look and feel of the existing database.

FIG. 21 is a flow diagram illustrating an example component-based method for automatically generating a user interface, according to some embodiments. The method shown in FIG. 21 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2110, in the illustrated embodiment, a computing system stores template information that defines a plurality of component types and one or more display parameters identified for one or more user interfaces. In the illustrated embodiment, a component type specifies a set of one or more user interface element types included in the component and a display parameter specifies how one or more components are to be displayed. In some embodiments, a plurality of component types are determined from one or more existing user interfaces, according to the techniques discussed above. In some embodiments, the computing system implements style transfer functionality to transfer the style of one of the existing interfaces to the automatically generated interface and/or merge two or more styles. Style may be implemented by selecting corresponding component types, display parameters, fonts, etc.

At 2120, in the illustrated embodiment, the computing system receives a request to automatically generate a user interface in accordance with the template information, wherein the request specifies data for a set of elements to be displayed in the user interface.

At 2130, in the illustrated embodiment, the computing system groups ones of the set of elements into multiple components according to multiple ones of the component types. In some embodiments, a machine learning module groups elements into components and may be trained based on past user input and/or user interactions with automatically generated interfaces.

At 2140, in the illustrated embodiment, the computing system formats the components according to the display parameters. The display parameters may specify formatting within one or more component types and/or among multiple components. The formatting may be based on one or more display characteristics of a display device. In non-visual interface embodiments, the formatting may be based on one or more output device characteristics (e.g., audio device type, target environment, etc.).

At 2150, in the illustrated embodiment, the computing system causes display of a user interface that displays the components based on the formatting. This may include transmitting the interface via one or more communication channels or controlling a display device, for example.

Example Style Transfer Techniques

As briefly discussed above, the disclosed techniques may be used to perform a style copy procedure. For example, the existing interface may be crawled and analyzed to determine a plurality of component types and/or display parameters. Examples of display parameters include, without limitation, layout parameters, formatting parameters, fonts, etc.

This component types and display information may then be used to generate an interface that exhibits the same style as the crawled interface. The new interface may be specified using input information that does not specify formatting, or using code such as a DOM that is modified based on the component types from the crawled interface. In some embodiments, component types may be determined based on elements from both interfaces (e.g., to generate new component types that do not exist in either interface. In some embodiments, interfaces may be merged to maintain component types from both interfaces in an output interface.

This may allow an entity to use an out-of-the-box template to initially set up their web application, but then copy style from another interface, such as their marketing site to achieve the correct style.

In some embodiments, an analysis module may also provide information regarding conventionality and/or design heuristics of the target interface. This module may provide insight regarding how similar the target is to known components, for example. The module may provide a topology score, which may be implemented as a chrome extension, sketch plugin, or app builder to facilitate manual interface design. In some embodiments, this module may objectively score designs based on the quality of their components, the number of different component types used, etc.

Example Display Device Constraints

As briefly discussed above, interface generator module 130 may generate interfaces based on one or more input constraints. For example, certain layout techniques may be preferable for smaller or larger displays or certain resolutions. Further, certain component types may be preferable for various device constraints. In some embodiments, interface generator module 130 may select from among multiple matching component types for a set of input data based on one or more device constraints such as resolution, display type, or display size. In some embodiments, interface generator module 130 may use different formatting and/or layout techniques based on different values of constraints. Therefore, the same underlying interface code may automatically generate markedly different interfaces in different scenarios, in some embodiments, without requiring hard-coding of templates for the different scenarios. Additional examples of constraints include user profile information, location, record type, domain, community, etc. In some embodiments, machine learning models may be separately trained for different constraint values.

Automatically Generating Interfaces for Predicted Events

In some embodiments, a computing system (which may or may not be the same computing system that implements interface generator module 130) is configured to predict that user input will be needed and automatically initiate a procedure that requests user input, e.g., based on one or more automation parameters. As one example, based on a user crossing a geo-fence, the computing system may initiate a procedure to request user input to book a hotel. As another example, based on a change in a customer relationship management database, the computing system may initiate a procedure to update a follow-up date for an event. In some embodiments, there is no pre-determined interface template for the initiated procedure. Rather, in these embodiments, interface generator module 130 is configured to automatically select one or more component types for an interface to request entry of the user input. Module 130 may also format within and/or among selected components. Note that the prediction may be speculative in nature, e.g., the user may decide not to provide input.

Automation parameters may include, for example: threshold velocity, location, calendar information, account information, location information, time information, information regarding communications, etc. In various embodiments, these parameters may be used to determine when to speculatively initiate a procedure. In some embodiments, some of these parameters may also be used as context parameters to constrain the interface that is automatically generated.

Note that interface generator module 130 may also select from among multiple types of interfaces to output the speculatively-generated interface. For example, based on a current velocity of the user, the system may predict that the user is driving and determine that a voice interface may be most effective. In this scenario, the computing device may call the user via a phone (or output audio directly if the device is a mobile device or vehicle computer system). In other situations, the computing system may determine to visually display the interface. Note that the computing system may select a channel for delivering the generated user interface based on context information as well, e.g., determining whether to send an SMS message, initiate a phone call, use a Bluetooth connection, use an internet connection, etc. For various types of interfaces, the selected component types may be used to control output of the interface information and receive user input. For example, audio output may be ordered based on the selected component type or a visual output may be formatted based on the selected component type.

In some embodiments, a prediction module is configured to generate a set of input data (e.g., in a JSON format) and provide it to interface generator module 130 without indicating formatting or organization of the input data. Module 130 may automatically generate an interface for the predicted task based on the various techniques discussed above. The interface generator module 130 may include an artificial intelligence engine to improve component type selection and formatting based on user interaction with generated interfaces for predicted tasks and/or administrator feedback.

In some embodiments, module 130 may automatically generate component types and/or display parameters from an existing user interface using any of the various techniques disclosed herein in order to match the look and feel of the existing interface when automatically generating interfaces for predicted events. This may allow the computing system to speculatively generate such interfaces even when it does not control the existing interface, for example.

In some embodiments, user information in the form of behavior, patterns, context, and/or signals are used to predict what users will likely be doing in the future on their device (e.g., changes to be displayed on a screen of a device of the user). In some embodiments, user information includes one or more of the following: calendar, email, location, time, velocity, etc. In some embodiments, user activity, such as clicking and/or usage patterns is used to predict user intentions (e.g., what the user desires to do at a given point in time).

In some embodiments, user information used to predict and generate one or more user interfaces for a user may advantageously improve navigation within the user interface (e.g., the user can locate what they are looking for quickly).

Figure 22:
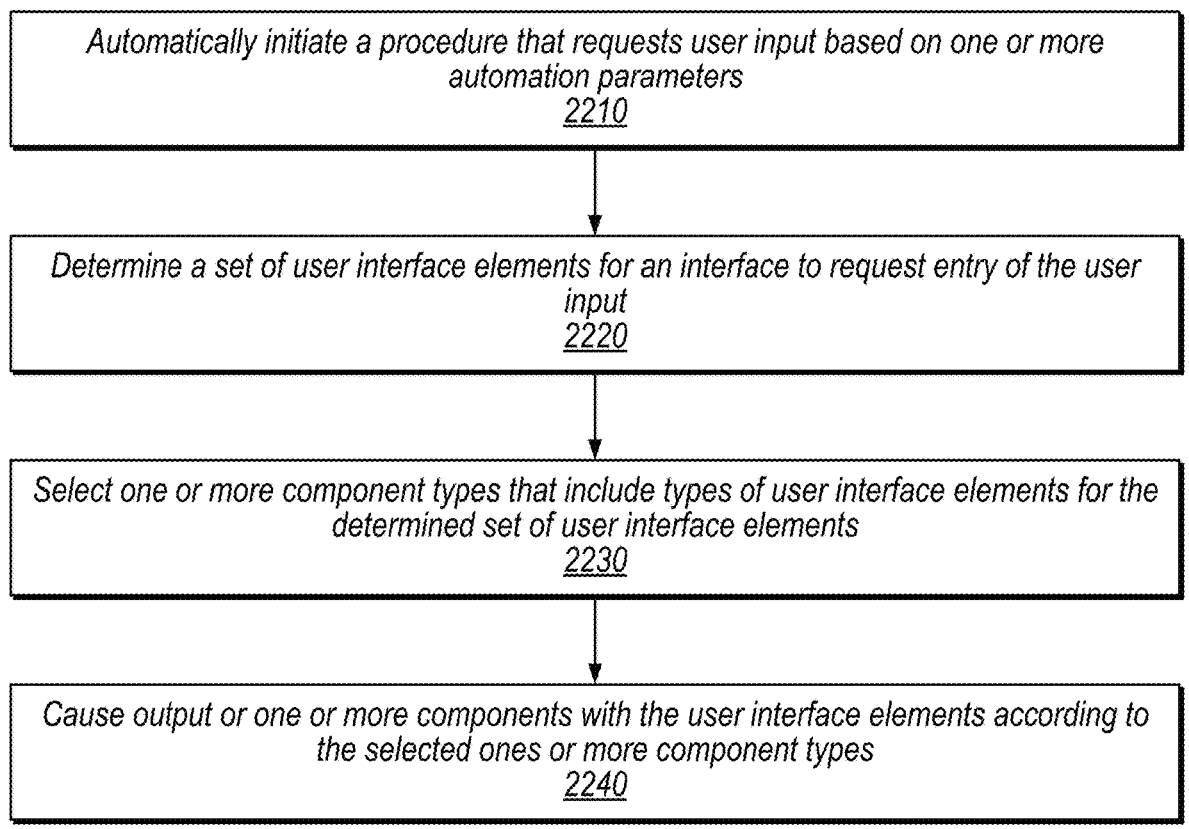
FIG. 22 is a flow diagram for automatically generating user interface information for a predicted event, according to some embodiments.

FIG. 22 is a flow diagram illustrating a method for automatically selecting component types for a predictive interface, according to some embodiments. The method shown in FIG. 22 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2210, in the illustrated embodiment, a computing system automatically initiates a procedure that requests user input based on one or more automation parameters.

At 2220, in the illustrated embodiment, the computing system determines a set of user interface elements for an interface to request entry of the user input. This may be based on input data that specifies information to be displayed and information to be received.

At 2230, in the illustrated embodiment, the computing system selects one or more component types that include types of user interface elements for the determined set of user interface elements. Note that a direct match of element types may not be required, but module 130, for example, may attempt to select a component that includes fields for all the input data. In some embodiments, component types may be selected based on one or more context parameters. In some embodiments, component types may be selected based on a target interface type (e.g., based on display resolution, type of display, whether the display includes audio and/or visual outputs, etc.).

At 2240, in the illustrated embodiment, the computing system causes output of one or more components with the user interface elements according to the selected ones or more component types. In some embodiments, this may include sending information specifying the user interface via one or more communication channels. Note that various elements discussed above may be performed locally by the device that outputs the components or by another device (e.g., by a remote server).

Example Machine Learning Techniques

As noted above, interface generator module 130 may, in various embodiments, use one or more machine learning modules to automatically generate user interface data. Further, as discussed above, various information may be used as training or input data for these machine learning modules, such as component type definitions, formatting information, display parameters, grouping information, classification information, etc. As described in more detail below with reference to FIGS. 23-25, various embodiments may utilize user feedback as training data to further refine one or more machine learning modules used to automatically generate user interfaces.

Figure 23:
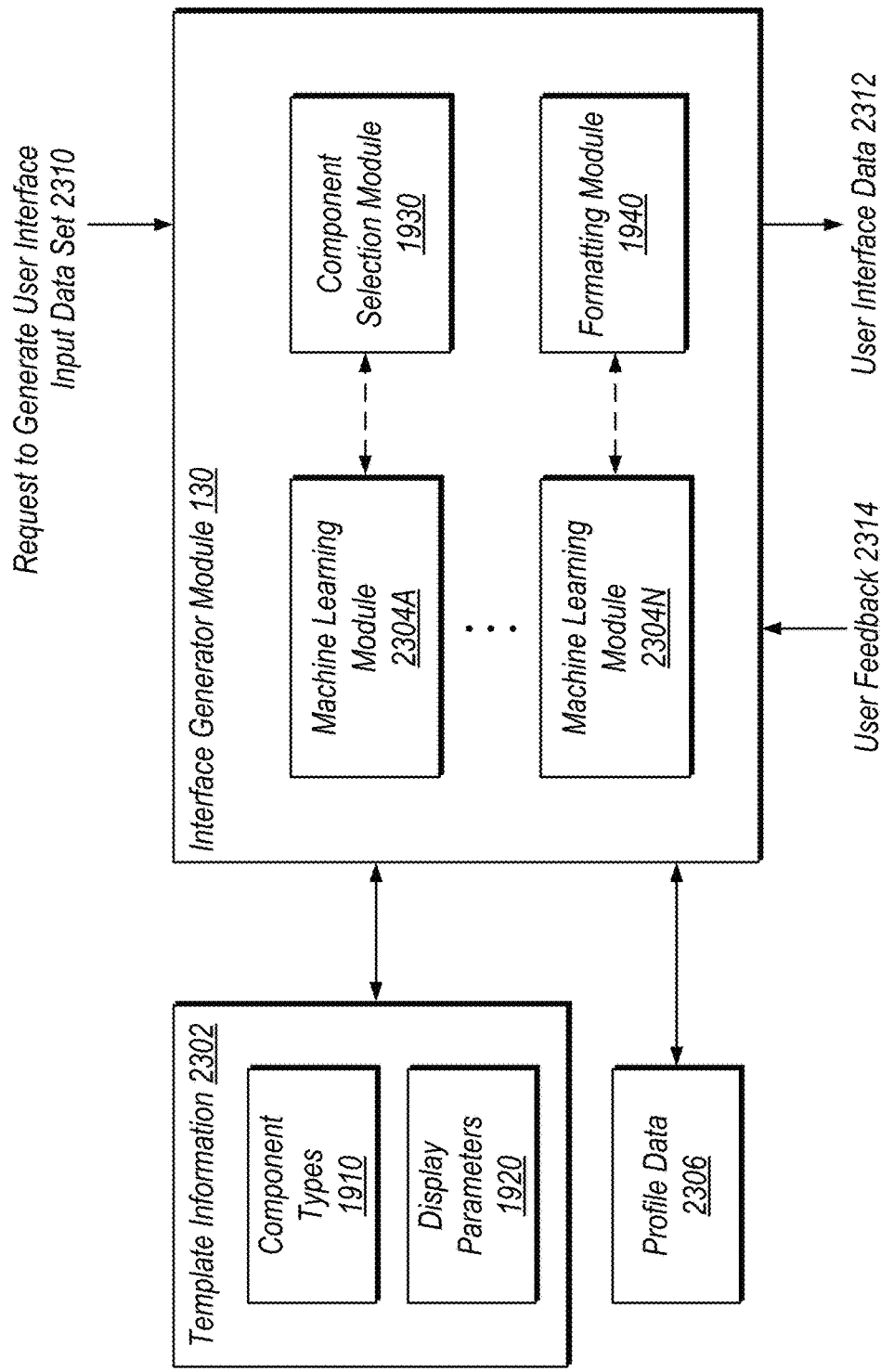
FIG. 23 is a block diagram illustrating an example interface generation module, according to some embodiments.

Referring now to FIG. 23, a block diagram of an example embodiment of interface generator module 130 is depicted, according to some embodiments. In FIG. 23, interface generator module 130 includes component selection module 1930, formatting module 1940, and machine learning modules 2304. Note that, although shown separately in FIG. 23, one or more machine learning modules 2304 may be included as part of component selection module 1930 or formatting module 1940, in some embodiments. Machine learning modules 2304, also referred to herein as machine learning engines, may use any of various suitable machine learning algorithms. For example, in some embodiments, the machine learning engines may use neural networks, vector machines, gradient boosting, naïve Bayes, linear regression, logistic regression, reduction, random forest, etc.

FIG. 23 further includes template information 2302. In various embodiments, the template information 2302 defines a plurality of component types 1910 and one or more display parameters 1920 identified for one or more user interfaces. As discussed in more detail above, a component type, in various embodiments, specifies a set of one or more user interface element types included in a given component, and a display parameter specifies how one or more components are to be displayed (e.g., within a larger user interface). Note that, in various embodiments, template information 2302 (including component types 1910 and display parameters 1920) may be either stored by module 130 or on one or more storage media accessible to module 130.

As described herein, interface generator module 130 is operable to automatically generate user interface data, according to various embodiments. For example, in the depicted embodiment, interface generator module 130 receives a request to generate a user interface, where the request includes an input data set 2310. As described above in reference to FIG. 19, interface generator module 130 may generate user interface data 2312 by selecting one or more component types, element types, and display parameters used to display the input data set 2310. The user interface data 2312, in various embodiments, may specify one or more user interfaces that may be provided to end users. Further, in some embodiments, the user interface data 2312 may specify multiple suggested components, component types, or user interfaces that may be provided to a user (e.g., an administrator or UX designer) who may select one or more aspects of the user interface that is ultimately exposed to end users, as described in reference to FIG. 24.

Interface generator module 130 may receive user feedback 2314 from one or more users based on the user interface data 2312. In some embodiments, the user feedback 2314 may correspond to user interaction with a user interface, including interactions such as selection activity (e.g., clicking), the time spent viewing different portions of the component or interface, user interface elements over which the user hovered a cursor, etc. In some embodiments, the user feedback 2314 may correspond to the user interaction of individual users or to the user interaction of one or more groups of users.

In embodiments in which multiple suggested user interfaces or user interface components are provided to a user, the user feedback 2314 may include information about the suggested interface or component selected by the user. For example, the user feedback 2314 may indicate which of the suggested user interfaces or user interface components was selected, specify a selected component type, specify various display parameters or formatting characteristics associated with the selected user interface or component(s) (e.g., size, rotation, layout, font color, font size, etc.), etc.

In various embodiments, the user feedback 2314 may be used to train one or more of the machine learning modules 2304. For example, in some embodiments, one or more of the machine learning modules 2304 may use data corresponding to user interaction with a given user interface or component as training data in an attempt to maximize or encourage particular user behavior, such as increasing the number of times link elements are selected, increasing the amount of time spent viewing various portions of the interface, etc. Further, in various embodiments, machine learning modules 2304 may be trained based on user feedback 2314 associated with a selected one of multiple suggested user interfaces or components for an input data set 2310. For example, one or more machine learning modules 2304 may use, as training data, the information (e.g., display parameters, component types, etc.) associated with the component or user interface selected by a user (e.g., a designer). Based on this data, the machine learning modules may modify the manner in which the suggested user interfaces or components are selected, in some embodiments. For example, in some embodiments, after undergoing training based on this feedback data, interface generator module 130 may suggest user interfaces or components that are similar to those previously selected by the user, similar users, or for similar input data sets 2310. Similarly, interface generator module 130 may format within components or among components based on the feedback data. Note that machine learning modules 2304 may be trained based on the user feedback 2314 in a supervised or unsupervised manner, according to various embodiments.

In some embodiments, multiple types of machine learning modules may be used to automatically generate user interfaces. For example, one machine learning engine may select component types and another engine may layout and format selected components. In embodiments with refinement of machine learning modules based on user feedback, all or a portion of the implemented types of machine learning modules may be refined.

FIG. 23 further depicts profile data 2306. As noted above, in some embodiments, the user feedback 2314 may correspond to the user interaction of individual users or to the user interaction of one or more groups of users. In some such embodiments, data corresponding to individual users or groups of users may be used to generate profiles, specified in profile data 2306, for those individual users or groups, which, in turn, may be used as an input to one or more of the machine learning modules 2304. In various embodiments, this may enable interface generator module 130 to automatically generate user interfaces or user interface components that are customized for a given individual or group based on the individual or group's respective user activity.

Figure 24:
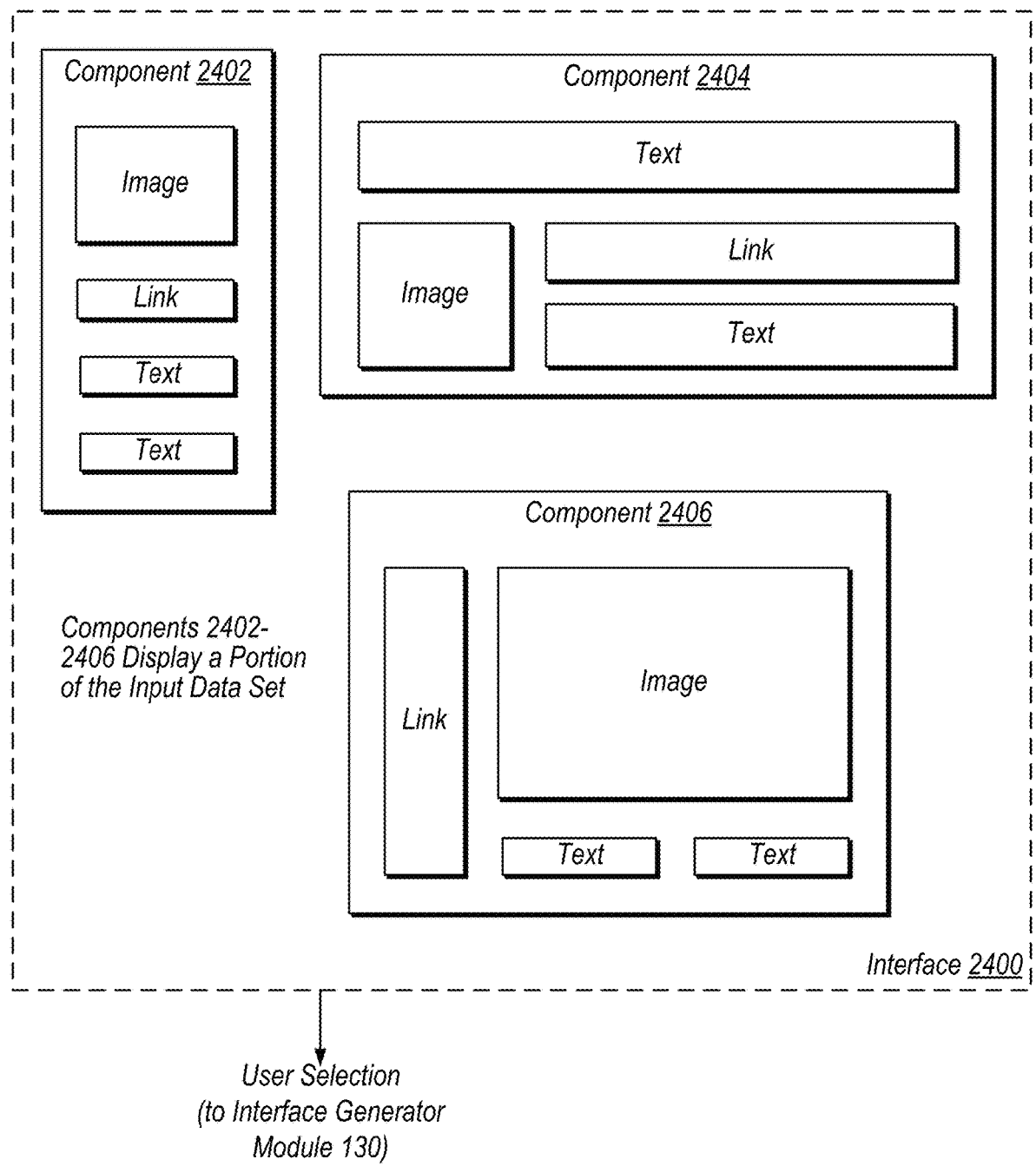
FIG. 24 is a block diagram illustrating an example interface used to suggest various automatically generated user interface components, according to some embodiments.

FIG. 24 illustrates an example interface used to suggest various automatically generated user interface components, according to some embodiments. In FIG. 24, interface 2400 depicts components 2402-2406, each of which may be suggested user interface components used to display a portion of the input data set 2310. For example, as discussed with reference to FIG. 23, interface generator module 130 may receive a request to generate a user interface, where the request specifies an input data set 2310. Interface generator module 130 may then automatically select (e.g., using component selection module 1930) various suggested component types to use to display the input data set 2310. Further, in various embodiments, module 130 may automatically generate representative components (e.g., components 2402-2406) corresponding to the suggested component types, and may cause display of the interface 2400 that includes the representative components 2402-2406 to a user. The user may then select one or more of the suggested components 2402-2406 to use to display the input data set 2310. This selection may be used to automatically generate, for the input data set 2310, a user interface to expose to one or more end users. Further, as discussed above, the user's selection may be provided as user feedback 2314 to interface generator module 130 to be used as training data for one or more machine learning module 2304.

Note that, in various embodiments, the accuracy of the components 2402-2406 suggested to the user may be improved through an iterative reinforcement learning process in which the module 130 is further refined based on the user feedback 2314. That is, applying various disclosed techniques, interface generator module 130 may be optimized to select the correct components to represent a given input data set 2310 and lay the suggested components out, within a user interface, following best practices derived through the machine learning model. Thus, in various embodiments, interface generator module 130 may use the user selections to refine machine learning module(s) 2304 and suggest improved user interfaces to the user.

Further note that, for clarity, only three components are shown in interface 2400. This embodiment is provided merely as an example and is not intended to limit the scope of the present disclosure. In other embodiments, any suitable number of components may be provided in interface 2400.

Figure 25:
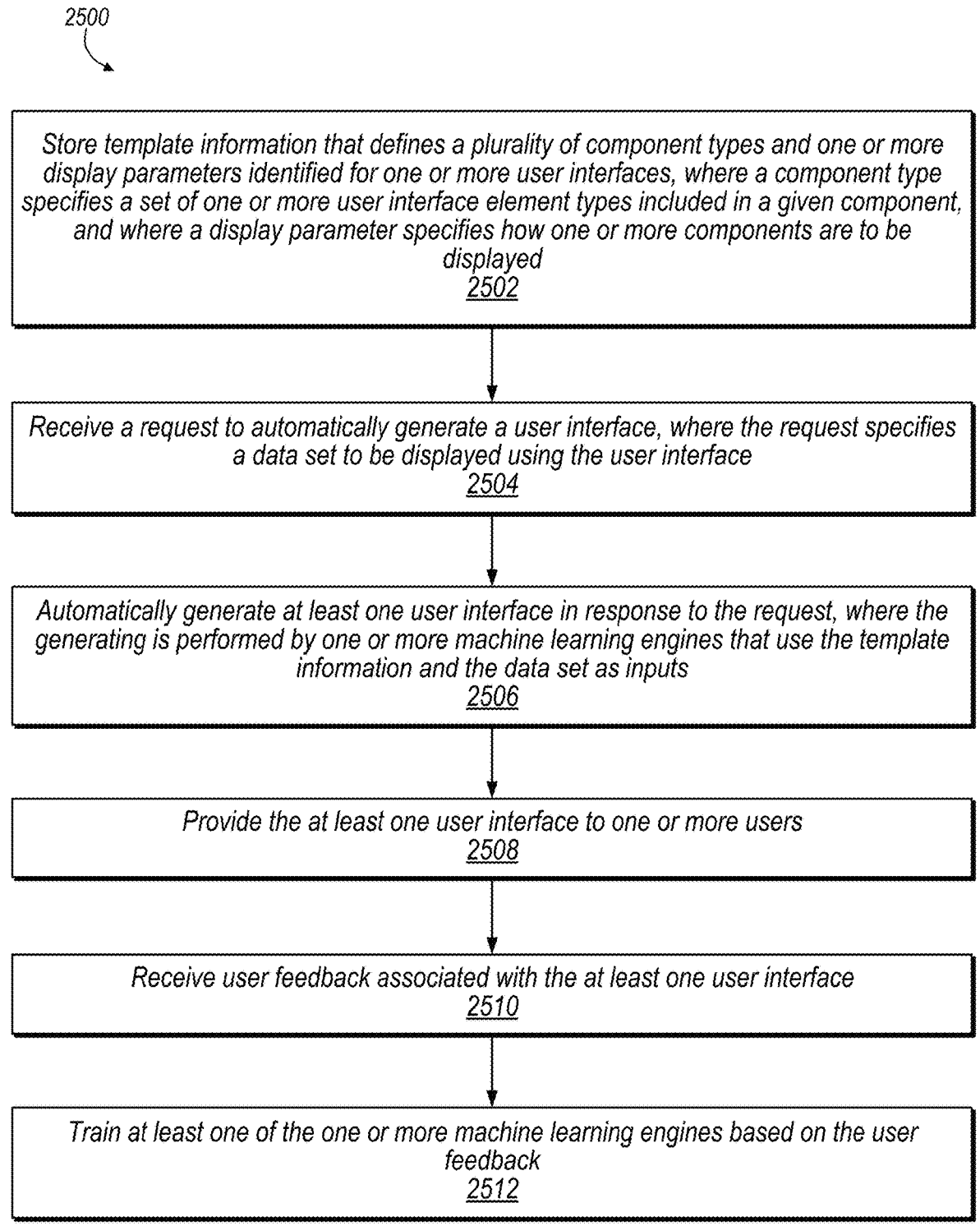
FIG. 25 is a flow diagram illustrating an example method for refining machine learning engines used to automatically generate component-based user interfaces, according to some embodiments.

Referring now to FIG. 25, a flow diagram illustrating an example method 2500 for refining, based on user feedback, machine learning engines used to automatically generate component-based user interfaces, according to some embodiments. The method shown in FIG. 25 may be used in conjunction with any of the computer circuitry, systems, devices, elements, or components disclosed herein, among others. In various embodiments, method 2500 may be performed to refine one or more machine learning modules 2304 included in the interface generator module 130 of FIG. 23. In various embodiments, method 2500 may be performed by a computer system that includes (or has access to) a non-transitory, computer-readable medium having program instructions stored thereon that are executable by the computer system to cause the operations described with reference to FIG. 25. In FIG. 25, method 2500 includes elements 2502-2512. While these elements are shown in a particular order for ease of understanding, other orders may be used. In various embodiments, some of the method elements may be performed concurrently, in a different order than shown, or may be omitted. Additional method elements may also be performed as desired.

At 2502, in the illustrated embodiment, a computer system stores template information that defines a plurality of component types and one or more display parameters identified for one or more user interfaces. In the illustrated embodiment, a component type specifies a set of one or more user interface element types included in a given component, and a display parameter specifies how one or more components are to be displayed.

At 2504, in the illustrated embodiment, the computer system receives a request to automatically generate a user interface, where the request specifies a data set to be displayed using the user interface.

At 2506, in the illustrated embodiment, the computer system automatically generates at least one user interface in response to the request, where the generating is performed by one or more machine learning modules that use the template information and the data set as inputs. For example, in response to the request, one or more machine learning modules 2304 may use the input data set 2310 and the template information 2302 to generate user interface data 2312. As noted above, user interface data 2312 may specify one or more automatically generated user interfaces.

At 2508, in the illustrated embodiment, the computer system provides the at least one user interface to one or more users. In some embodiments, provided interfaces may include a selection of one or more component types through which to display the input data set 2310 and an arrangement of one or more components, corresponding to the one or more component types, displaying the input data set 2310 in one or more user interface elements.

At 2510, in the illustrated embodiment, the computer system receives user feedback associated with the at least one user interface. As noted above, the user feedback 2314 may take various forms. For example, in some embodiments, the user feedback includes data corresponding to user interaction with the at least one user interface. In some embodiments, for example, the data corresponding to the user interaction includes at least one of click data for one or more user interface elements included in the at least one user interface, or hover data for one or more user interface elements included in the at least one user interface. In other embodiments, the user feedback 2314 may include data corresponding to the user interaction of a particular user or a particular set of one or more users (e.g., all or a subset of users associated with a particular tenant in a multi-tenant system).

At 2512, in the illustrated embodiment, method 2500 includes training at least one of the one or more machine learning modules based on the user feedback. In some embodiments, element 2512 may include selectively training at least one of the one or more machine learning modules based on the data corresponding to the user interaction of a particular user or a particular set of one or more users.

Note that, in some embodiments, automatically generating the at least one user interface may include automatically selecting a plurality of suggested component types for a subset of the input data set 2310. For example, in some such embodiments, method 2500 may further include automatically generating, for the plurality of suggested component types, a corresponding plurality of representative components, and causing display of a particular user interface that includes the corresponding plurality of representative components, where each of the corresponding plurality of representative components depicts the subset of the data set. Further, in some such embodiments, the computer system may receive input indicating a selected component type of the plurality of suggested component types, where the at least one user interface provided to the one or more users includes at least a portion of the data set depicted using the selected component type.

Further note that, in some embodiments, providing the at least one user interface to the one or more users includes providing the at least one user interface in a first interactive format (e.g., via display on a computer monitor) and in a second, different interactive format (e.g., via an AR/VR device, HUD device, display on mobile device, an audio format, or any other suitable interactive format), and the user feedback 2314 may include data specifying an interactive format used by the one or more users to interact with the at least one user interface.

In some embodiments, method 2500 may further include modifying the template information 2302 based on the user feedback 2314. For example, in some embodiments, the computer system may modify data associated with the component types 1910 or display parameters 1920 based on the particular component types or display parameters associated with a selected component type chosen by a user (e.g., an administrator). Additionally, in embodiments in which the user feedback 2314 includes data corresponding to the user interaction of a particular user or a particular set of one or more users, method 2500 may include generating a profile for the particular user, or the particular set of one or more users, where the profile may then be used as an input for at least one of the one or more machine learning modules 2304.

Example Computing Device

Figure 26:
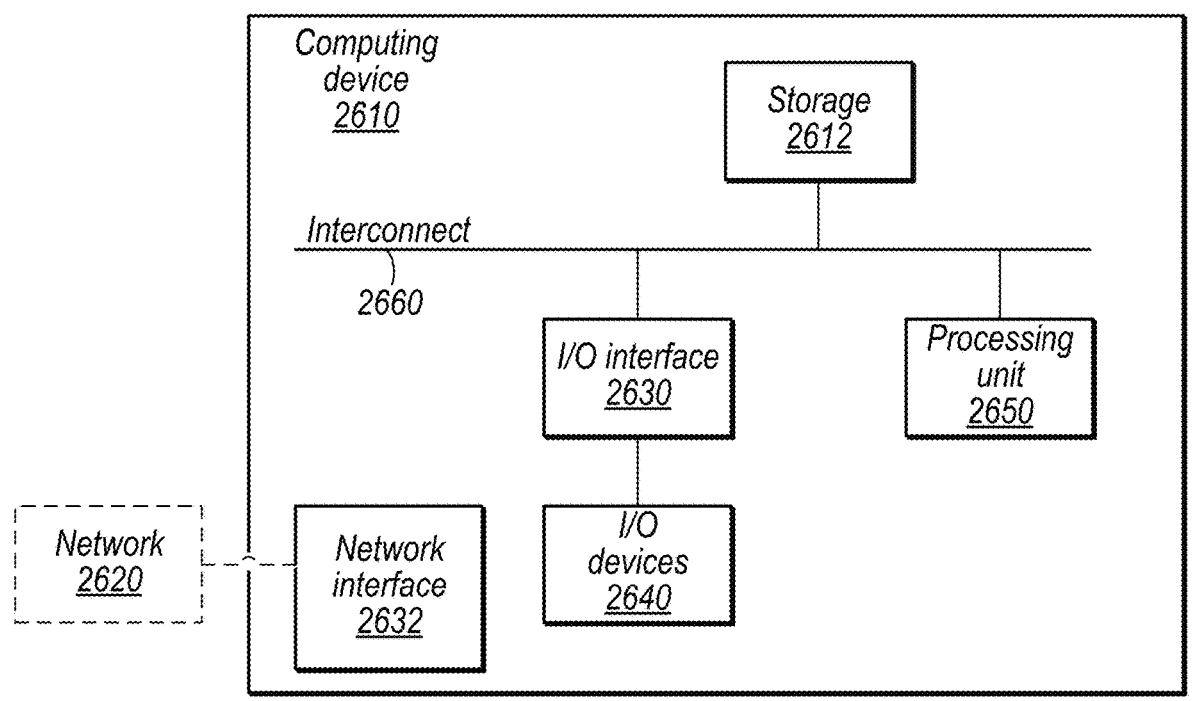
FIG. 26 is a block diagram illustrating an example computing device, according to some embodiments.

Turning now to FIG. 26, a block diagram of a computing device (which may also be referred to as a computing system) 2610 is depicted, according to some embodiments. Computing device 2610 may be used to implement various portions of this disclosure. Computing device 2610 is one example of a device that may be used as a mobile device, a server computer system, a client computer system, or any other computing system implementing portions of this disclosure.

Computing device 2610 may be any suitable type of device, including, but not limited to, a personal computer system, desktop computer, laptop or notebook computer, mobile phone, mainframe computer system, web server, workstation, or network computer. As shown, computing device 2610 includes processing unit 2650, storage subsystem 2612, and input/output (I/O) interface 2630 coupled via interconnect 2660 (e.g., a system bus). I/O interface 630 may be coupled to one or more I/O devices 2640. Computing device 2610 further includes network interface 2632, which may be coupled to network 2620 for communications with, for example, other computing devices.

Processing unit 2650 includes one or more processors, and in some embodiments, includes one or more coprocessor units. In some embodiments, multiple instances of processing unit 2650 may be coupled to interconnect 2660. Processing unit 2650 (or each processor within processing unit 2650) may contain a cache or other form of on-board memory. In some embodiments, processing unit 2650 may be implemented as a general-purpose processing unit, and in other embodiments it may be implemented as a special purpose processing unit (e.g., an ASIC). In general, computing device 2610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 2612 is usable by processing unit 2650 (e.g., to store instructions executable by and data used by processing unit 2650). Storage subsystem 2612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 2612 may consist solely of volatile memory in some embodiments. Storage subsystem 2612 may store program instructions executable by computing device 2610 using processing unit 2650, including program instructions executable to cause computing device 2610 to implement the various techniques disclosed herein.

I/O interface 2630 may represent one or more interfaces and may be any of various types of interfaces configured to couple to and communicate with other devices, according to various embodiments. In some embodiments, I/O interface 2630 is a bridge chip from a front-side to one or more back-side buses. I/O interface 2630 may be coupled to one or more I/O devices 2640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 26 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

determining, by a computing system based on hierarchical user interface code, a plurality of visible elements of a graphical user interface, wherein the hierarchical user interface code includes multiple hierarchical levels with relationships between code at different levels of the hierarchy;

determining, by the computing system, coordinates within the interface for ones of the plurality of visible elements;

determining, by the computing system, levels within the hierarchical user interface code at which ones of the plurality of visible elements are specified;

identifying, by the computing system, multiple groups of visible elements, wherein the identifying is based on the determined coordinates and levels and wherein ones of the groups include multiple visible elements of the plurality of visible elements; and comparing, by the computing system, the groups to identify two or more groups of visible elements that meet a threshold similarity criterion.

2. The method of claim 1, wherein the comparing is based on an analysis of the user interface code associated with the two or more groups.

3. The method of claim 1, wherein the comparing includes analyzing visual representations of the two or more groups to determine visual similarity.

4. The method of claim 3, wherein the analyzing uses a geospatial database.

5. The method of claim 3, wherein the analyzing is based on bounding boxes corresponding to the determined coordinates.

6. The method of claim 1, further comprising merging user interface code for the two or more groups that meet the threshold similarity criterion.

7. The method of claim 1, wherein the relationships include parent-child relationships in a tree structure.

8. The method of claim 1, further comprising classifying ones of the visible elements as ones of a set of known element types, wherein the identifying is based on the classifying.

9. A non-transitory computer-readable medium having instructions stored thereon that are capable of execution by a computing device to perform operations comprising:

determining, based on hierarchical user interface code, a plurality of visible elements of a graphical user interface, wherein the hierarchical user interface code includes multiple hierarchical levels with relationships between code at different levels of the hierarchy;

determining coordinates within the interface for ones of the plurality of visible elements;

determining levels within the hierarchical user interface code at which ones of the plurality of visible elements are specified;

identifying multiple groups of visible elements, wherein the is based on the determined coordinates and levels and wherein ones of the groups include multiple visible elements of the plurality of visible elements; and comparing the groups to identify two or more groups of visible elements that meet a threshold similarity criterion.

10. The non-transitory computer-readable medium of claim 9, wherein the comparing is based on an analysis of the user interface code associated with the two or more groups.

11. The non-transitory computer-readable medium of claim 9, wherein the comparing includes analyzing visual representations of the two or more groups to determine visual similarity.

12. The non-transitory computer-readable medium of claim 11, wherein the analyzing uses a geospatial database.

13. The non-transitory computer-readable medium of claim 11, wherein the analyzing is based on bounding boxes corresponding to the determined coordinates.

14. The non-transitory computer-readable medium of claim 9, wherein the operations further comprise merging user interface code for the two or more groups that meet the threshold similarity criterion.

15. The non-transitory computer-readable medium of claim 9, wherein the operations further comprise generating a report that identifies the two or more groups and a determined similarity value.

16. The non-transitory computer-readable medium of claim 9, wherein the operations further comprise classifying ones of the visible elements as ones of a set of known element types, wherein the is based on the classifying.

17. An apparatus, comprising:

one or more storage elements having program instructions stored thereon; and one or more processors configured to execute the program instruction to:

determine, based on hierarchical user interface code, a plurality of visible elements of a graphical user interface, wherein the hierarchical user interface code includes multiple hierarchical levels with relationships between code at different levels of the hierarchy;

determine coordinates within the interface for ones of the plurality of visible elements;

determine levels within the hierarchical user interface code at which ones of the plurality of visible elements are specified;

identify multiple groups of visible elements, wherein the identification is based on the determined coordinates and depth levels and wherein ones of the groups include multiple visible elements of the plurality of visible elements; and comparing the groups to identify two or more groups of visible elements that meet a threshold similarity criterion.

18. The apparatus of claim 17, wherein the comparison is based on an analysis of the user interface code associated with the two or more groups.

19. The apparatus of claim 17, wherein the comparison includes analysis of visual representations of the two or more groups to determine visual similarity.

20. The apparatus of claim 19, wherein the analysis includes access to a geospatial database.

* * * * *